US000001960H

(19) United States

(12) Statutory Invention Registration (10) Reg. No.: US H1960 H

Conrad et al. (43) Published: Jun. 5, 2001

(54) AUTOMATED METHOD AND SYSTEM FOR TESTING BLOOD SAMPLES

(75) Inventors: Andrew J. Conrad, Los Angeles; Charles M. Heldebrant, Arcadia; Shawn D. Latham, Sierra Madre; Lorraine B. Peddada, Arcadia, all of CA (US)

(73) Assignee: Alpha Therapeutic Corp.

(21) Appl. No.: 08/893,869

(22) Filed: Jul. 11, 1997

Related U.S. Application Data

(63) Continuation-in-part of application No. 08/779,052, filed on Jan. 6, 1997, now abandoned, which is a continuation-in-part of application No. 08/683,784, filed on Jul. 16, 1996, now Pat. No. 5,834,660, which is a division of application No. 08/419,620, filed on Apr. 10, 1995, now Pat. No. 5,591,573.

(51) Int. Cl.[7] ..... G01N 35/00

(52) U.S. Cl. ..... 73/864.82

(58) Field of Search ..... 73/863, 863.11, 73/864.34, 864.73, 864.91, 64.56, 863.81, 864.81, 864.82, 863.32, 864.21; 435/30; 220/DIG. 7, 507; 604/409, 410; 53/469, 476, 477, 479; 141/240, 114; 206/730; 100/99

(56) References Cited

U.S. PATENT DOCUMENTS 3,855,868 * 12/1974 Sudvaniemi ..... 73/863.32

4,478,095 * 10/1984 Bradley et al. ..... 73/864.21

4,713,974 * 12/1987 Stone ..... 73/864.21

* cited by examiner

*Primary Examiner*—Daniel T. Pihulic

(74) *Attorney, Agent, or Firm*—Christie, Parker & Hale

(57) ABSTRACT

An automated system and process is provided for pooling samples from a multiplicity of blood or plasma donations for subsequent testing to uniquely identify any such blood or plasma donations which may be infected with a particular virus. The system includes an autosampler needle which is directly inserted into a blood or plasma sample aliquot container in order to withdraw an aliquot portion of the contents for forming a sample pool with aliquot portions of other blood or plasma samples. The autosampler comprises a tubular piercing member having a hollow interior bore and a tubular shroud surrounding the piercing member.

28 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUTOMATED METHOD AND SYSTEM FOR TESTING BLOOD SAMPLES

CROSS-REFERENCE TO RELATED APPLICATIONS

This application is a continuation-in-part of application Ser. No. 08/779,052, filed Jan. 6, 1997, (now abandoned) which is a continuation-in-part of application Ser. No. 08/683,784, filed Jul. 16, 1996, (now U.S. Pat. No. 5,834,660) which is a division of application Ser. No. 08/419,620, filed Apr. 10, 1995, (now U.S. Pat. No. 5,591,573) all the contents of which are expressly incorporated herein by reference.

FIELD OF THE INVENTION

The present invention relates generally to systems and processes for preparing and analyzing samples taken from plasma donations to uniquely identify donations which are virus contaminated. In particular, the invention relates to an apparatus and process for forming individual, separately sealed containers for holding samples of the same plasma as is contained in a donation. The invention also relates to an automated apparatus and process for forming initial screening test pools in a safe, cost effective manner.

BACKGROUND OF THE INVENTION

Blood, plasma, and biological fluid donation programs are essential first steps in the manufacture of pharmaceutical and blood products that improve the quality of life and that are used to save lives in a variety of traumatic situations. Such products are used for the treatment of immunologic disorders, for the treatment of hemophilia, and are also used in maintaining and restoring blood volume during surgical procedures and other treatment protocols. The therapeutic uses of blood, plasma, and biological fluids require that donations of these materials be as free as possible from viral contamination. Typically, a serology test sample from each individual blood, plasma, or other fluid donation is tested for various antibodies which are elicited in response to specific viruses; particularly hepatitis C (HCV) and two forms of the human immunodeficiency virus (HIV-1 and HIV-2). In addition, the serology test sample may be tested for antigens designated for specific viruses such as hepatitis B (HBV), as well as antibodies elicited in response to such viruses. If the sample is serology positive for the presence of either specific antibodies or antigens, the donation is excluded from further use.

Whereas as an antigen test for certain viruses, such as hepatitis B, is thought to be closely correlated with infectivity, antibody tests may not be so closely correlated. It has long been known that a blood plasma donor may, in fact, be infected with a virus while testing serology negative for antibodies related to that virus. For example, a window exists between the time that a donor may become infected with a virus and the appearance of antibodies elicited in response to that virus in the donor's system. The time period between the first occurrence of a virus in the blood and the presence of detectable antibodies elicited in response to that virus is known as the "window period". In the case of HIV, the average window period is approximately 22 days, while for HCV, the average window period has been estimated at approximately 98 days. Therefore, tests directed to the detection of antibodies may give a false indication for an infected donor if performed during the window period, i.e., the period between viral infection and the production of antibodies. Moreover, even though conventional serology testing for HBV includes tests for both antibodies and antigens, testing by more sensitive methods have confirmed the presence of the HBV virus in samples which were negative in the HBV antigen test.

In order to minimize the possibility of incipient viral contamination of blood, plasma or biological fluid donations which have passed available antibody and antigen tests, the donations are preferably tested by a polymerase chain reaction (PCR) method. PCR is a highly sensitive method for detecting the presence of specific DNA or RNA sequences related to a virus of interest in a biological material by amplifying the viral genome. Because the PCR test is directed to detecting the presence of an essential component of the virus itself, its presence in a donor may be detected almost immediately after infection. There is, theoretically therefore, no window period during which a test may give a false indication of freedom of infectivity. A suitable description of the methodology and practical application of PCR testing is contained in U.S. Pat. No. 5,176,995, the disclosure of which is expressly incorporated herein by reference.

PCR testing is, however, very expensive and since the general donor population includes a relatively small number of donors infected with the viruses of interest, individual testing of each donation is not cost effective or economically feasible. Hence, an efficient and cost-effective method of testing large numbers of blood or plasma donations to eliminate units having a viral concentration above a predetermined level is required.

One method of testing a large number of plasma donations is to take samples of a number of individual plasma donations and form them into a pool. The pool is then PCR tested and the individual donations comprising the pool are either retained or disposed of depending on the outcome of the PCR test. While reducing the number of PCR tests, and the costs associated therewith, this method results in a substantial waste of a significant number of virus free donations. Since only a single donation with a viral concentration above a pre-determined level will cause a pool to test PCR positive, the remaining donations that contribute to a pool may well be individually PCR negative. This result is highly probable given that a relatively small number of PCR positive donors exist in the general donor population. In the conventional pooling approach, all donations comprising the pool are disposed of upon a PCR positive result, including those donations that are individually PCR negative.

In addition, plasma donations are often frozen soon after they are received. When samples of individual plasma donations are needed for pooling, each donation must be thawed, an aliquot of the blood or plasma removed from the donation, and the donation must then be refrozen for preservation. Multiple freeze-thaw cycles may adversely effect the recovery of the RNA or DNA of interest as well as the proteins contained within the plasma, thus adversely effecting the integrity of the PCR test. Moreover, each time an aliquot of individual plasma donations is withdrawn to form a pool, the donation is subject to contamination, both from the surrounding environment and from the apparatus used to withdraw the aliquot. Further, if the donation contains a virus, it can contaminate other donations. In order to avoid introducing viral contaminants into an otherwise viral free donation, the sample taking apparatus must be either sterilized after each individual use or used for taking only a single aliquot from a single individual donation. A fresh, or sterilized, sample taking apparatus must be used for taking an aliquot from a subsequent individual donation. Either of these methods involves considerable expense and is quite time consuming.

Recently, several advances have been disclosed in the prior art that relate to systems and methods for preparing pools of individual plasma donation samples for PCR testing. In particular, U.S. Pat. No. 5,591,573 describes a cost-effective and efficient process for preparing and testing samples from a multiplicity of blood or plasma donations to uniquely identify donations which are infected with the virus as well as systems and devices for practicing the process. A flexible collection segment is connected to a blood or plasma donation collection container and is in fluid communication with the inside of the container. The collection segment is filled with blood or plasma from the container and a portion of the collection segment is heat sealed at both ends. The sealed portion of the collection segment is removed from the container and, either before or after the sealed collection segment portion is removed, spaced-apart heat seals are provided at regular intervals along the length of the segment between the sealed ends. The segment portions in the intervals between adjacent seals define sample pouches which each contains a plasma or blood sample. The tubing segment, which has been converted into a series of pouches, has been disconnected from the plasma collection bottle and frozen until needed for testing.

To begin the testing process, a first pouch is removed from each of a group of segments and a portion of the contents of each first pouch is withdrawn and formed into a pool. Depending on the test results of an initial pool, aliquots may be taken from additional sample pouches of each of the plasma donations and formed into subpools. The process is iterated, with each viral positive pool being further subdivided into successively smaller subgroups, with each of the successive subgroups comprising a fraction of the samples of the preceding positive subgroup, until the final pouch corresponding to a single viral positive plasma donation is identified.

In order to form a generational pool, appropriate sample pouches, having the same generational index as the pool to be formed, are arranged on a titer plate and held in place by a cover which contains access openings though which sample pouches may be accessed by a cannula. A portion of the contents of each sample pouch is withdrawn and the contents formed into a pool in a pooling container.

While relatively simple and cost effective, such a system of manual sample extraction is time consuming and requires a laboratory clinician to pay careful attention to each step of the process. In particular, care must be taken in order to prevent carry-over contamination, i.e., a clean or sterilized cannula must be used to withdraw samples for each generational pool. Accordingly, with a manual sample extraction system, used cannulas which may be contaminated with HBV, HIV-1 or HIV-2 virus, must be removed from the sample extraction apparatus for either sterilization or replacement. The dangers attendant with manual manipulation of "sharps" of this type are significant and well known.

Accordingly, there exists a need for an automated system and method for preparing pools and subpools for PCR testing, which enhances safety by minimizing the degree of manual intervention and manipulation. Such a system and method should be able to extract aliquots from blood and/or plasma donation samples in a manner which minimizes the potential for environmental contamination through "splashing" or "out-gassing", while also minimizing the volume of potentially hazardous materials which must be disposed of.

SUMMARY OF THE INVENTION

There is, therefore, provided in the practice of this invention, a cost-effective, efficient, automated system and process for pooling samples from a multiplicity of blood or plasma donations for subsequent testing to uniquely identify blood or plasma donations which are infected with a particular virus.

The process and system of the present invention results in blood and plasma products being substantially safer because one can quickly prepare pools from blood or plasma donations and can readily test for virus contamination in the blood or plasma supply directly. Cost-effective, high-sensitivity testing can be performed immediately, and contaminated donations identified, without regard to the infectivity window period. In one embodiment of practice of the present invention, an autosampler needle is provided for direct insertion into a blood or plasma sample aliquot container in order to withdraw an aliquot portion of the contents for formation with additional aliquot portions into a pool. The autosampler needle comprises a generally tubular piercing member having a hollow interior bore which defines a fluid communication path between an orifice formed at a distal end, and aspiration tubing. The autosampler needle further comprises a generally tubular shroud which surrounds the piercing member and extends at least partially along its length in the direction of the orifice. The shroud is spaced-apart from the exterior peripheral surface of the piercing member so as to define an annular chamber surrounding the piercing member.

A vent chamber is coupled to the shroud and is in fluid communication with the annular chamber. The piercing member extends through the vent chamber but is not in communication therewith. The vent chamber includes a vent fitting which provides a fluid communication path between the vent chamber and the surrounding environment in order to provide a pressure relief path for equalizing pressure when the autosampler needle is inserted into a sample aliquot container and a blood or plasma sample is extracted therefrom by aspiration.

In an additional aspect of the present invention, the vent fitting may be connected to a pressurized gas source, such as air or dry nitrogen, which is forced into the vent chamber and the shroud's annular chamber, thereby pressurizing the sample aliquot container and causing an aliquot portion thereof to be forced into the piercing member through the orifice from whence it is extracted to form a pool.

In a more detailed embodiment of the present invention, the piercing member is constructed to terminate at a distal end in a deflected, non-coring tip so as to be easily insertable into a flexible hollow tubing segment or able to penetrate a septum formed in a branch leg of a medical Y-site.

In a further aspect of the present invention, a regular linear array of vented autosampler needles is connected along the length of a pooling manifold so as to enable an apparatus of the present invention to extract aliquot portions from a multiplicity of sample aliquot containers in a single operation. The pooling manifold is a hollow, generally cylindrical tube to which a vacuum source may be connected for aspiration aliquot portions of a blood or plasma sample through each of the attached vented autosampler needles. The needles are each separated by a pre-determined distance which is the same as the distance separating sample aliquot container receptacles formed on a sample plate, such that the pooling manifold, autosampler needle and sample plate, in combination, form a "ganged" sample extraction system.

In a further exemplary embodiment of the present invention, an automated system is described for preparing a plasma pool from a multiplicity of separate plasma donations. The automated system suitably comprises a rotatable sample-containing carousel which includes a regular array of sample aliquot container receptacles and which is contained within a closed container. A cover is disposed over the carousel, and includes at least one gasketed opening, such that the cover and closed container define a sealed environment which encloses the carousel. The vented autosampler needle is connected to the distal end of a movable arm which is cantilevered over the carousel cover. The arm is movable along the carousel cover so as to position the autosampler needle over the gasketed opening. The arm is further movable in the vertical direction to enable the arm to insert the autosampler needle through the gasketed opening and place the needle into contact with a selected one of the sample aliquot containers arranged in the carousel. The autosampler needle withdraws a portion of the contents of the sample aliquot container and is raised by the arm from communication with the container. The carousel is rotatably indexed to place a next sample aliquot container beneath the gasketed opening and the vented autosampler needle is again inserted into communication with the container.

In a more detailed embodiment of the invention, a multiplicity of gasketed openings are provided in the carousel cover and a pooling manifold including a multiplicity of vented autosampler needles is connected to the distal end of the movable arm. As sample aliquot containers are indexed past the row of gasketed openings, the movable arm lowers the array of autosampler needles into communication with the containers, so as to withdraw aliquot portions from a multiplicity of containers in a single operation. Aliquot portions from a multiplicity of blood or plasma samples are thus safely and cost-effectively collected in accordance with the present invention and formed into pools for testing. All samples in each carousel are collected and formed into one pool. Therefore, a single needle may be used for extracting sample aliquot portions without regard to cross-contamination.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

The present invention relates to systems, processes and devices useful for testing blood or plasma donations to detect those specific donations which are contaminated with a viral concentration above a pre-determined level. Such contaminated donations are then disposed of to thereby prevent their incorporation into the raw material stream for pharmaceutical products or their transfusion into human patients. The viral detection tests used in accordance with practice of the present invention can be any that directly detect a virus instead of antibodies elicited in response to the virus. The tests preferably include polymerase chain reaction (PCR) tests, but other tests which are sufficiently sensitive to directly detect a virus even after pooling samples from multiple donations are within the contemplation of the present invention.

In one embodiment of practice of the present invention, a plurality of separate blood or plasma donations are provided. A blood or plasma sample is drawn from each donation into a corresponding flexible, hollow tubing segment. A plurality of spaced-apart seals are provided at intervals along the length of the tubing segment, so that segment portions in the intervals between seals define pouches which each contain a blood or plasma sample. As is discussed below in greater detail, an automated apparatus is provided in accordance with the present invention for forming plasma samples from the pouches into pools. Subsequently, the pools are tested in accordance with one of a multiplicity of unique methodologies to thereby efficiently and affectively detect and isolate any blood or plasma donation which is contaminated with the virus.

Figure 1:
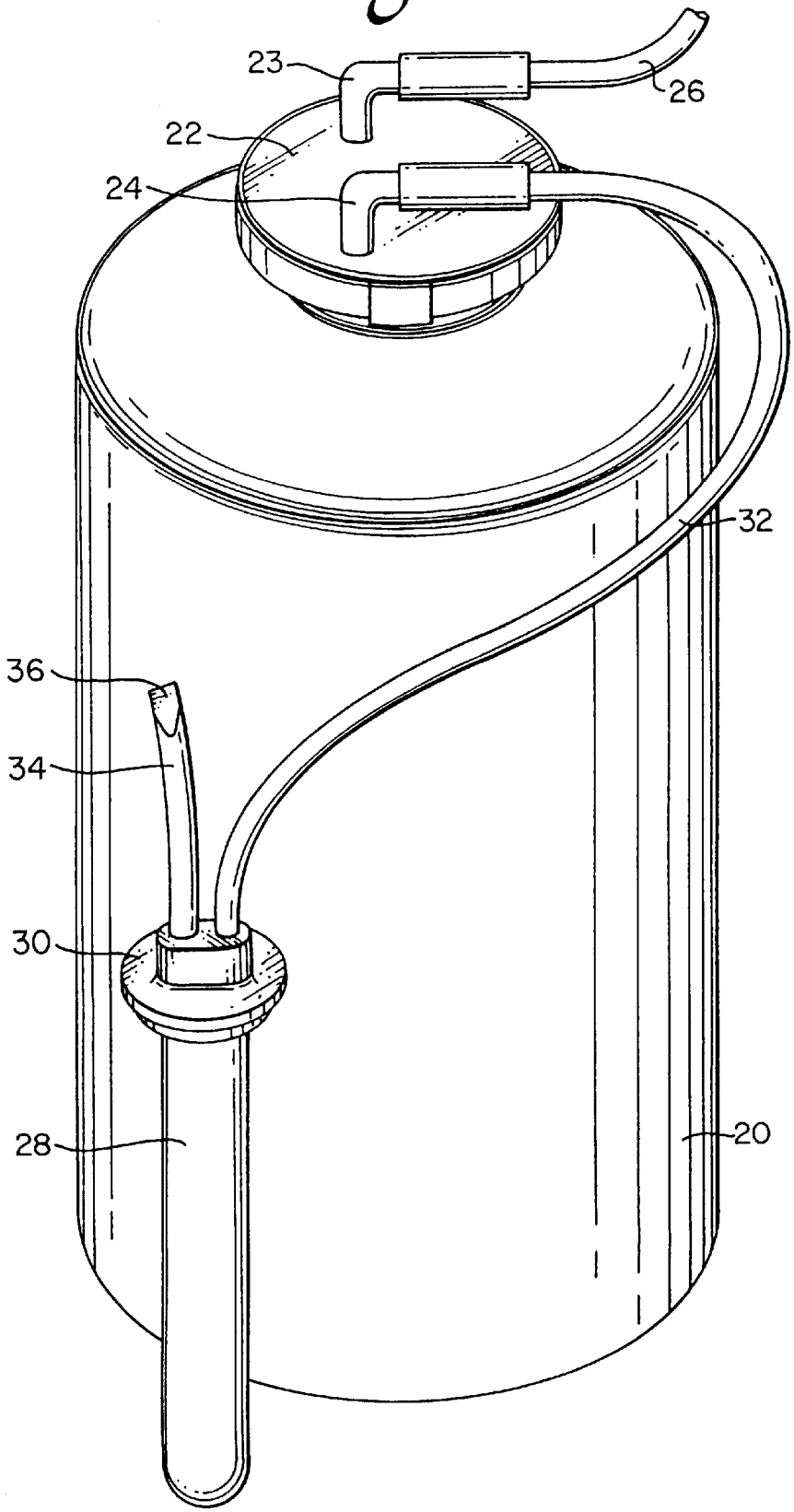
FIG. 1 is a semi-schematic perspective view of one example of a plasma donation bottle and sample container attached by a tubing segment useful in the practice of the present invention.

Turning to FIG. 1, an exemplary embodiment of a system provided in accordance with practice of the present invention for effecting the sampling and pooling process is shown. The system includes a standard plasma donation container 20, constructed of a non-reactive material such as polyvinyl chloride (PVC). Accessed to the donation container 20 as provided through a cap 22 which includes two hollow elbow shaped fittings 23 and 24, respectively, provided on the top surface thereof. The fittings communicate with the interior of the donation container 20 through orifices provided in cap 22 for such purpose. A flexible hollow filler tube 26, constructed of a biologically neutral material, such as PVC plastic, connects at one end to the elbow fitting 23 and connects at the other end to, for example, a needle or catheter which is inserted into a donor in order to procure a donation. An illustrated embodiment, a test container 28, is also provided for collecting a sample from the donation which is to be used for serology testing. The test container 28 is generally test-tube shaped and is also constructed of a biologically non-reactive material. The test container 28 includes an integral cap member 30 through which orifices are provided in order to communicate with the interior of the test container.

Connection between the cap member 30 of the test container 28 and the hollow elbow fitting 24 of the plasma donation container cap is made by a flexible hollow tubing segment 32, constructed as a biologically non-reactive plastic material. The tubing segment 32 is coupled to the cap member 30 in a manner such that fluid passing through the tubing segment will enter the test container 28 through an orifice provided in the cap member 30 for that purpose. The tubing segment 32 may be friction fit into said orifice, sonically welded thereto, or otherwise coupled in a coaxial relationship with the orifice by techniques well understood by those skilled in the art. Additionally, a second orifice may be provided in the cap member 30, to which a vent tube 34 is coupled in a manner similar to the tubing segment 32. The vent tube 34 is typically no more than one to two inches length, and is typically terminated with an inserted, friction fit bacteria exclusion filter 36.

In the exemplary embodiment, a blood or plasma donation is withdrawn from a donor and collected in the plasma donation container 20 for subsequent storage until needed. In the case of a plasma donation, blood is commonly withdrawn from a donor and passed through a continuous centrifuge apparatus, wherein red blood cells are centrifuged out from the supporting plasma fluid and returned to the donor. The plasma is subsequently collected in the donation container 20.

After a blood or plasma donation is taken from a donor and the donation container 20 is filled, the donation container is tilted in order to raise the fluid level over the elbow fitting 24 connected to the tubing segment 32. Blood or plasma then enters the tubing segment, flows through the tubing segment and into the test container 28. During filling, air trapped within the test container 28 escapes through the vent tube 34, allowing the test container to be completely filled. The bacteria exclusion filter 36 functions to filter out any bacteria in the return air flow, thus preventing contamination of the sample by the surrounding environment. After the test container is filled, the donation container remains tilted in order to allow blood or plasma from the donation to be decanted into the tubing segment 32 until the tubing segment is filled.

Figure 2:
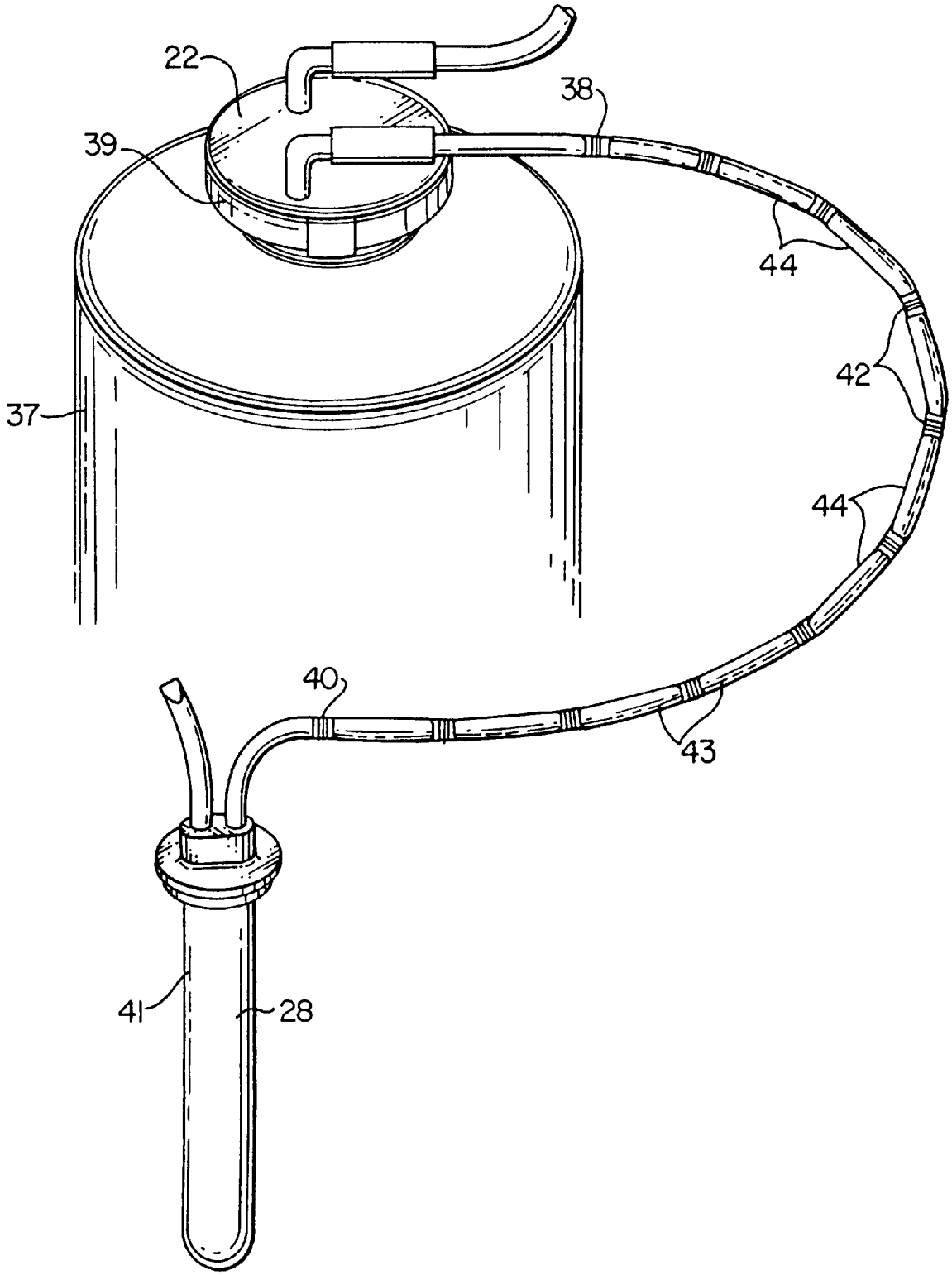
FIG. 2 is a semi-schematic perspective view of a tubing segment connected between a plasma donation bottle and a sample container and divided into pouches in accordance with the present invention.

Turning now to FIG. 2, after the blood or plasma sample from the donation is decanted into the tubing segment 32, the tubing segment is sealed by a heat weld 38 or other suitable sealing means such as a sonic weld, at a location proximate to the tubing segment's connection to the plasma donation container 20. A further heat seal 40 is applied to the tubing segment at a location proximate to the segment's connection to the test container 28. An elongated hollow tube, closed off at both ends, and containing a quantity of the blood or plasma donation is thus formed.

The filled portion of the tubing segment 32 is removed from the plasma donation and test containers (20 and 28 respectively) by cutting the tubing segment through the center of the seals 38 and 40, thus removing the tubing segment 32 from the containers while maintaining all of the fluid carrying components in a sealed-off condition. The separated blood or plasma donation container 20 is then removed for freezing and storage, while the separated test container 28 is transferred to a clinical laboratory for serology testing. Typically, the contents of the test container are evaluated for the presence of various antibodies which are elicited in response to specific viruses, such as hepatitis C (HCV), or HIV-1 and HIV-2.

Following removal of the tubing segment 32 from the containers, additional seals 42 are subsequently provided at spaced-apart intervals along the length of the tubing segment, to define sequential, individual and connected sample pouches each of which suitably comprises a hollow tubing segment portion 44. Each such segment portion 44 contains a pre-determined quantity of blood or plasma defined as the particular quantity needed for the specific generation pool which is to be formed. For example, with regard to PCR testing, pouches are formed with an interior volume adequate to contain approximately 0.02 to 0.5 milliliters of a blood or plasma sample from the host donation.

The length of the tubing segment 32 and the distance between individual seals 42 are chosen such that from 5 to 15 individual and connected pouches may be obtained from a tubing segment. Sealing, to define the individual pouches, may be performed after the tubing segment has been removed from between the plasma donation container 20 and the serology test container 28 but preferably, is performed while the tubing segment is still attached to the plasma donation container, in order to avoid hydrostatic pressure build-up. The pouch defining seals may be made by any one of a number of known methods, such as thermal-compression sealing (heat sealing), sonic welding or the like, so long as the length of the tubing region which is compressed and sealed is sufficient to permit the connected pouches to be separated from one another by cutting though the center of the seal, without violating the integrity of the pouch on either side, as is indicated more clearly in FIGS. 3*a* and 3*b*.

Figure 2A:
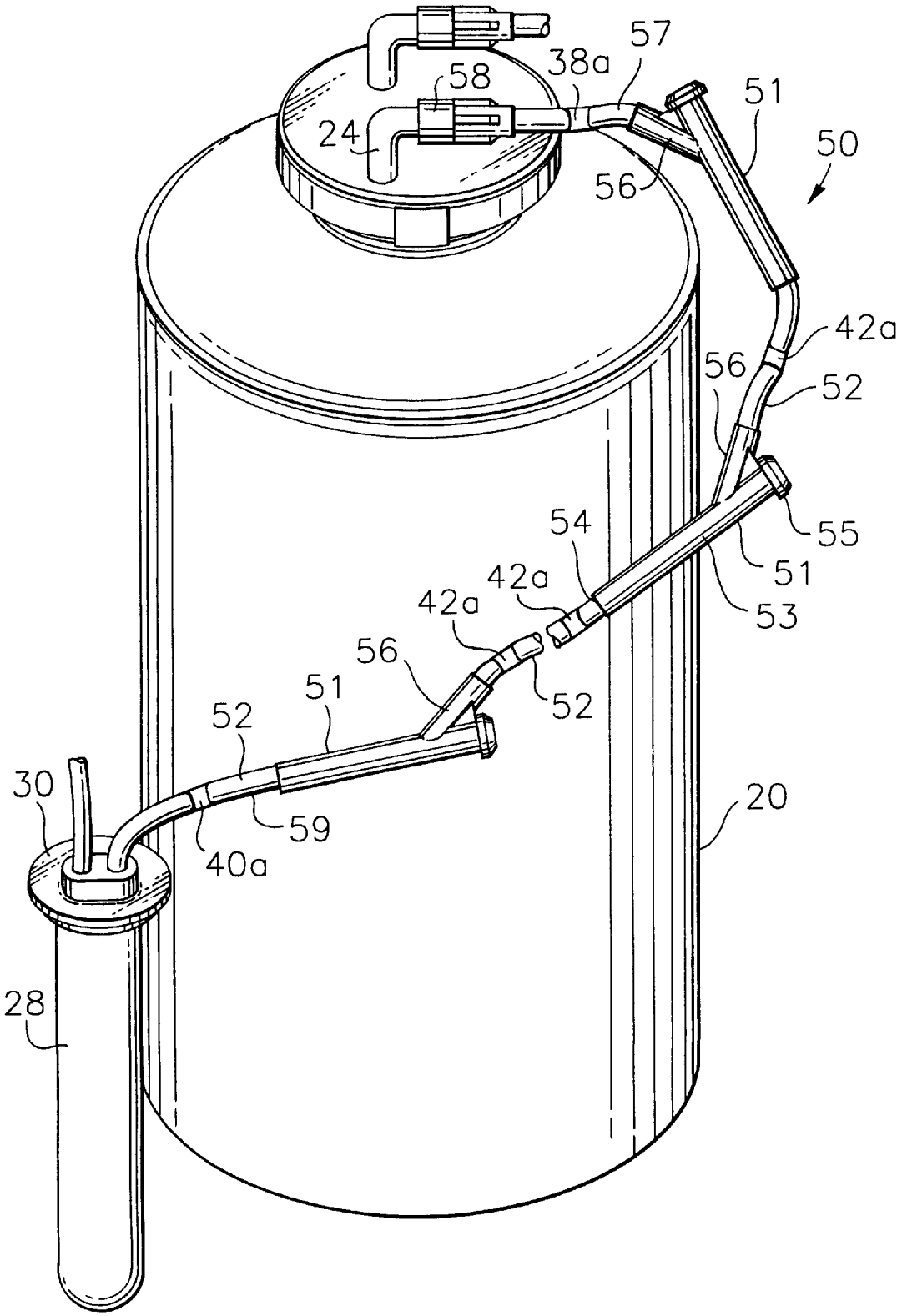
FIG. 2*a* is a semi-schematic perspective view of a tubing segment connected between a plasma donation bottle and sample container and including a series of linked-together Y-sites in accordance with the present invention.

A second embodiment of a tubing segment adapted to be subdivided into blood or plasma sample-containing aliquot portions is depicted in FIG. 2*a*. This illustration is a semi-schematic perspective view of an additional embodiment of a collection tubing segment 50 coupled between a blood or plasma donation container 20 and serology test container 28, and which is divided into aliquot-containing sample portions in accordance with the present invention.

As was the case with the preceding embodiment, the collection tubing segment 50 is coupled between the cap member 30 of the test container 28 and the hollow elbow fitting 24 of the blood or plasma donation container cap 22. In the embodiment illustrated in FIG. 2*a*, the tubing segment 50 suitably comprises a plurality of Y-sites 51 connected together in series fashion by flexible, hollow, medical-grade plastic tubing segments 52. The Y-sites 51 are generally commercially available from a variety of sources and are of the type commonly adapted for connection to an intravenous infusion set. The Y-sites 51 typically comprise a cylindrical body portion 53 with a flow path defined therethrough and include an outlet 54 at one end of the flow path and an access site 55 at the other end. The access site 55 may comprise a pierceable, generally self-sealing membrane which stretches over the exterior of the cylindrical body portion 53, thus closing-off the flow path or alternatively, may comprise a generally disc-shaped, self-sealing septum adapted to be pierced by a "sharps" or penetrated by a blunt cannula through a pre-formed slit. A branch port 56 is provided along the body 53 of the Y-site between the outlet end 54 of the flow path and the access site 55. Branch port 56 extends away from the body 53 at approximately a 45° angle and includes a fluid path provided therethrough which is in communication with the fluid path between the access site 55 and the outlet 54.

A multiplicity of Y-sites are connected to one another by solvent bonding a flexible, hollow, medical-grade plastic tube 52 between the outlet port 54 of one Y-site to the branch port 56 of the next Y-site comprising the series. Subsequent Y-sites are connected in outlet-port-to-branch-port fashion to thereby form a repeating series of linked Y-sites 51 and tubing segments 52. To begin the series, an initial hollow entry tube 57 is solvent bonded to the branch port of the initial Y-site of the series. The initial entry tube 57 is connected, in turn, to the elbow fitting 24 of the blood or plasma donation container cap 22. Connection may be made by friction-fitting the entry tube 57 onto the elbow fitting 24, sonically welding the tube thereto, or otherwise attaching the entry tube in a coaxial relationship with the fitting, by techniques well understood by those skilled in the art. Moreover, the initial entry tube 57 may terminate in a standard luer-type fitting 58 which would allow the series-connected Y-sites 51 to be removably coupled to a donation container which was provided with a mating luer-type connector at the end of the elbow fitting 24.

In like manner, the terminal Y-site of the series is fitted with a flexible, hollow terminal exit tube 59 which is solid-bonded to the terminal Y-site at its outlet port. The exit tube 59 is connected, in turn, to the cap member 30 of the serology test container 28. As described above, connection may be made by friction-fitting the exit tube 59 into the cap member 30, sonically welding the tube thereto, or the like. Moreover, the exit tube 59 may also be connected to a standard luer-type fitting at its distal end which would allow connection to a serology test container 28 which was provided with a mating luer-type connector.

In a manner similar to that described in connection the preceding embodiment, after a blood or plasma donation is withdrawn from a donor and the donation container 20 is filled, the donation container is tiled so as to raise the fluid level over the elbow fitting 24 connected to the entry tube segment 57. As decanting proceeds, plasma enters the tubing segment and flows through the series-connected Y-sites, entering each sequential Y-site through its branch port 56 and flowing into the next Y-site from the preceding Y-site's outlet port 54. Blood or plasma is decanted until the test container 28 is filled, following which the blood or plasma donation is further decanted until the series-connected Y-sites comprising the tubing segment 50 are also filled. It should be noted that there will be some unfilled volume or "head space" in each Y-site, in the region between the intersection of the branch port 56 with the body 53 and the access site 55. It will be understood by those having skill in the art that this "head space" volume is rather small and moreover, will be uniform from Y-site to Y-site, thus having minimal to no impact on the uniformity of sample volumes contained in each Y-site.

After the blood or plasma sample from a donation is decanted into the tubing segment 50, the terminal exit tubing segment 59 is closed off by a heat seal 40*a* or other suitable sealing means such as a sonic weld or the like, at a suitable location along its length proximate to the terminal exit tubing segment's connection to the serology test container 28. The serology test container 28 is removed from the filled tubing segment 50 by cutting the terminal exit tubing segment 59 away from the test container through the center of the seal 40*a*. Alternatively, if the exit tubing segment 59 terminates in a luer-type connector, the tubing segment 59 is merely decoupled from the test container 28 by disconnecting the luer. A second heat seal 38*a* is applied to the initial entry tubing segment 57 at a location along its length proximate to the segment's connection to the elbow fitting 24 of the donation container 20. The series connected Y-sites comprising the filled portion of the tubing segment 50, are removed from the blood or plasma donation by cutting the initial entry segment 57 away through the center of the seal 38*a,* or by disconnecting a luer-type fitting 58, if such is provided. An elongated, hollow, articulated tube, comprising alternating rigid hollow Y-sites and flexible hollow plastic tubing segments, linked together in series and closed-off at both ends, is thus provided. Each of the linked-together Y-sites contains a sample aliquot of the blood or plasma donation.

As will be described in greater detail below, additional heat seals 42*a* are formed in each tubing segment which connects a preceding Y-site's outlet port to a subsequent Y-site's branch port. The heat seals 42*a* thus isolate the Y-sites from one another to define sequential, individual, and connected sample aliquots, each of which suitably comprise an individual Y-site. Each such Y-site contains a predetermined quantity of blood or plasma the particular quantity being determined by the amount needed for a specific generation pool to be formed. Sealing, to isolate one Y-site from another, may be performed either after the tubing segment 50 has been removed from the plasma donation container 20 or alternatively, may be performed while the tubing segment 50 is still attached. Preferably, the Y-site isolation seals 42*a* are formed while the tubing segment 50 is still attached to the blood or plasma donation container 20 so that the volumetric reduction caused by flattening a portion of the tubing during the sealing process does not cause a build-up in the internal hydrostatic pressure of the sample. When the tubing segment 50 remains connected to the plasma donation container, excess fluid under pressure caused by the volumetric reduction of the tubing created by the heat seals, is allowed to be expressed back into the donation container. Excess hydrostatic pressure, which may lead to dangerous "spurting" or "outgassing" during sample extraction, is thus safely relieved.

Sealing may be performed by any one of a variety of known methods, such as thermal-compression sealing (heat sealing), sonic welding or the like, so long as the length of the region which is compressed and sealed is sufficient to permit the connected Y-sites to be separated from one another by cutting through the center of the seal without violating the integrity of the tubing segment on either side of the seal.

Figure 3A:
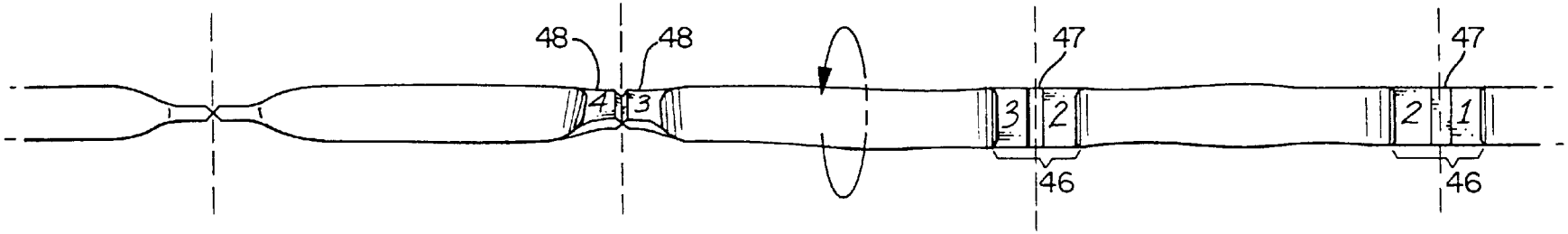
FIG. 3*a* is an enlarged top plan view of a portion of the tubing segment shown in FIG. 2 showing additional details of the seals which separate the pouches.
Figure 3B:
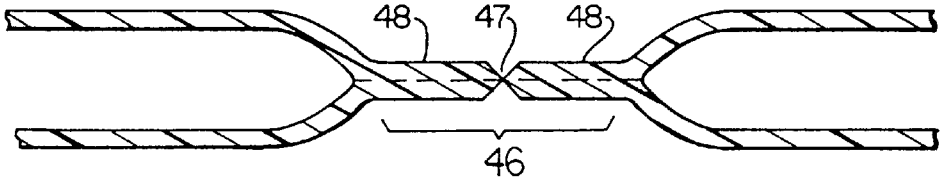
FIG. 3*b* is a semi-schematic cross-sectional view of a tubing segment seal.

Turning now to FIGS. 3*a* and 3*b* in a preferred embodiment, the seal between pouches (42 of FIG. 2) and/or Y-sites (51 of FIG. 2*a*) is formed to comprise a flat pad area 46, which may include a narrow central portion or neck 47 through which the seal may be cut or torn in order to separate the connected pouches or Y-sites from one another. Cutting the seal is performed through the central portion or neck in order to ensure that each separated pouch retains a substantial seal at compressed pad portions 48 which remain at either end of a pouch following seal separation at the neck 47. The length of the seal pad 46 may be made greater or smaller, depending on the precision of the chosen separation method. Although the reduced cross section of the neck 47 allows the pouches to be torn-away from one another, pouch separation may be more safely performed by using a scalpel, a guillotine cutter, or even a simple pair of scissors.

It should be noted, that although the illustrated embodiment of FIGS. 3*a* and 3*b* has been described in connection with sample pouches (42 of FIG. 2), the seals 46 may be formed with equal facility along the flexible tubing segments (52 of FIG. 2*a*) which link together the series-connected Y-sites 51 of FIG. 2*a*.

Figure 4:
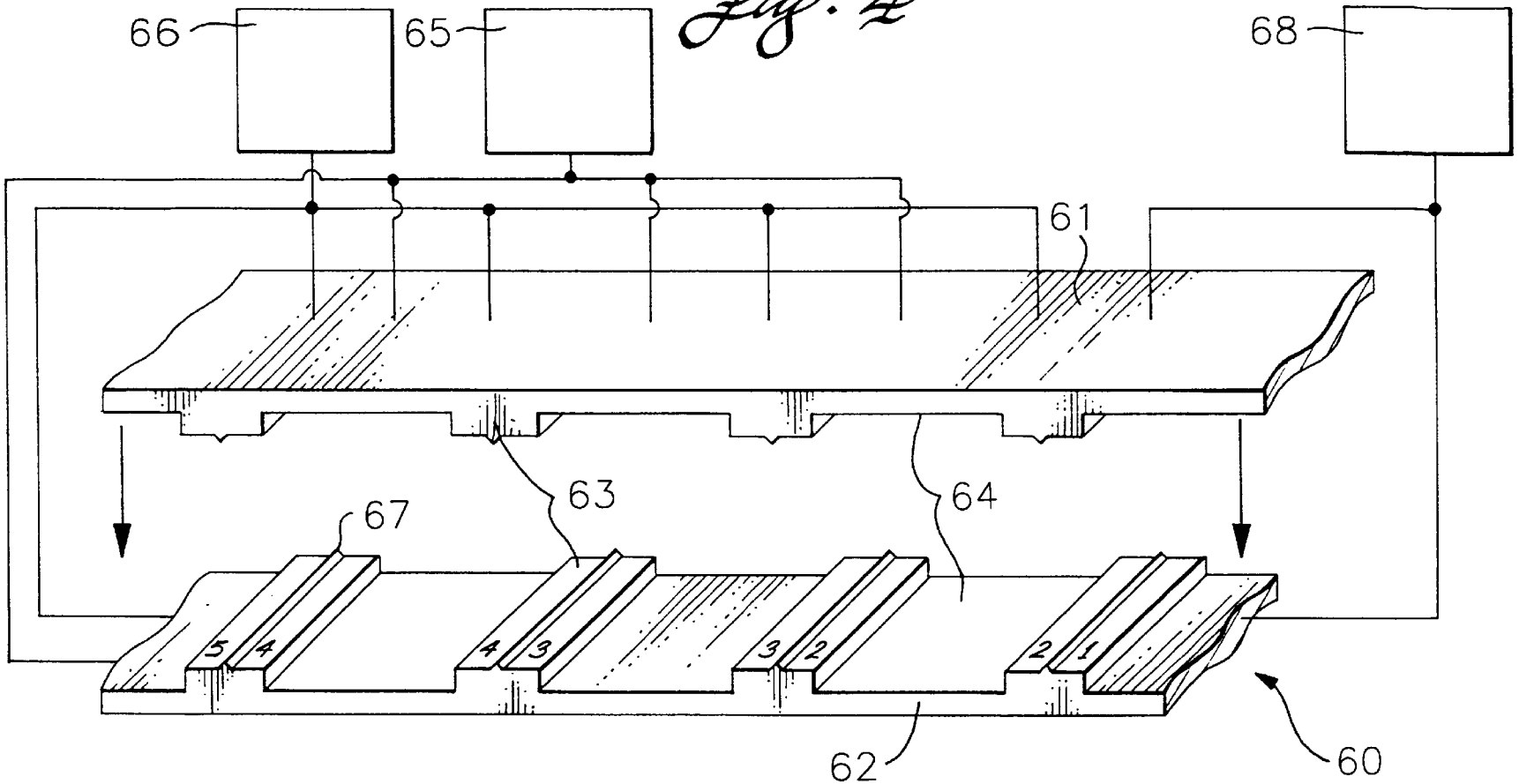
FIG. 4 is a semi-schematic perspective view of a device provided in accordance with practice of the present invention for sealing a tubing segment into individual pouches.

Turning now to FIG. 4, there is illustrated an exemplary embodiment of a sealing device 60 which is useful for forming heat seals along the length of either a uniform tubing segment (32 of FIG. 1) or an articulated tubing segment (50 of FIG. 2*a*). The sealing device 60 is adapted to form heat seals which separate a uniform tubing segment into sample-containing pouches of specific desired sizes, or to seal off the flexible tubing segments between series-connected Y-sites and thus form sample aliquot containers therefrom. The sealing device 60 suitably comprises opposed first and second platens 61 and 62, respectively, each of which includes a plurality of raised seal head portions 63, disposed in a spaced-apart relationship on the opposing surfaces of the platens. The sealing device 60 is preferably constructed such that the raised seal head portions 63 are movable along their respective platens so that the spacing from one raised seal head portion to another may be continuously varied. The raised seal heads 63 may be arranged along the platen such that the distance between successive seal heads is made progressively smaller so that sealing is performed along the length of the tubing segment at progressively closer spaced intervals. Thus, sample pouches of progressively smaller size, and, therefore, progressively smaller volume content may be formed by moving pairs of opposed seal heads along their respective platens to a desired location. It will be understood, however, that this particular feature may not be desirable when a series of linked-together Y-sites are to be separated by heat sealing. Because each Y-site is the same as any other in the series, the flexible tubing segments connecting the Y-sites will be understood to have a periodic linear relationship. Accordingly, when heat sealing a series of Y-sites, the seal heads 63 will preferably be disposed at uniform intervals along the length of their respective platens.

In order to form multiple heat seals along the length of either a plastic tubing segment or the length of series-connected Y-sites, filled with the blood or plasma sample, the tubing segment or Y-sites are placed within the sealing device 60 between the upper and lower sealing platens 61 and 62, respectively. The opposed platens are brought into proximity with one another and heat and pressure are applied, thus compressing and sealing the flexible material of the plastic tube. As depicted in FIG. 4, the plurality of spaced-apart, extended or raised seal head portions 63 along the length of each platen are separated by alternating recesses 64. As the opposed platens are moved together to form heat seals, on those regions of a plastic tubing segment which is compressed between the seal heads, the opposed alternating recesses 64 form chambers which accommodate those portions of the sample aliquot container which are not be compressed. Accordingly, chambers formed by opposing recesses 64 define pouches on the one hand, or alternatively, provide a convenient pocket in which to house the rigid material of a Y-site as its flexible connective tubing is compressed and sealed. Thus, each chamber defined by each closed pair of recesses is configured to house either a pouch or a Y-site.

A heating element 65 is configured to heat each of the seal head portions of the platen such that a heat seal is formed when the platens of the sealing device are closed together and pressure is applied. The heating element 65 may be any one of a variety of well known heater types such as formed wire resistance heaters, induction heaters, radiant heaters or the like. Heating element 65 is preferably connected directly to each of the raised seal heads 63 to thereby form a heat seal only in the region of the heads and without unduly heating the recesses. If desired, Teflon® tape insulation can be applied over the surface of, for example a resistive wire, to reduce heat transfer between the heating element 65 and the adjacent recesses. In the exemplary embodiment, a cooling device 66, such as cooling or radiator fins, a moving air flow, a cold finger, or the like, may also be connected to the sealing device 60. A cooling device 66 is connected directly to each of the recesses 64 so that the chambers defined when opposing recessed portions move together are maintained at a low temperature. Blood or plasma samples held in sample aliquot containers formed within the chamber during the seal process are thus protected from the high heat seal temperatures, which might otherwise damage or thermally degrade the blood or plasma sample.

The narrow neck area, (47 of FIG. 3*b*) through approximately the center of the seal may be formed by an elongated, generally triangular ridge structure 67 which is provided down the center of the extended seal head portion 64 of the seal platens. As a tubing segment is squeezed between the upper and lower sealing heads, the ridge 67 forces an indentation on the top and bottom surface of the seal. The indentations narrow the plastic material comprising the center of the seal thus forming a reduced cross-section tear-strip for easy separation.

In one embodiment of the invention, the ridge 67 may be serrated in order to provide perforations along the length of the ridge, i.e., in a direction orthogonal to the major axis of the tubing segments. The perforations would allow individual sample aliquot containers to be removed from one another without the danger inherent with cutting with a sharp objection, violating the integrity of the pouch by inadvertently cutting through to the sample containing area. Perforations are preferably provided during the seal process by providing the seal heads with serrated ridges. Alternatively, perforations may be provided shortly after the heat seal by means of a separate perforating jig or dye.

Means 68 are also provided to open and close the sealing device 60 in order to compress seal platens together and thus form periodic seals along the length of a sample aliquot container. Such means are well known in the art and may suitably comprise a manual apparatus such as a lever handle coupled to the top platen 61 and which moves the top platen against, for example, a hinge to open and close the apparatus. Other suitable arrangements may include vertical guides, springs, or a hydraulically operated piston press, or other common mechanical, electrical, or hydraulic presses well known to those skilled in the art.

Figure 4A:
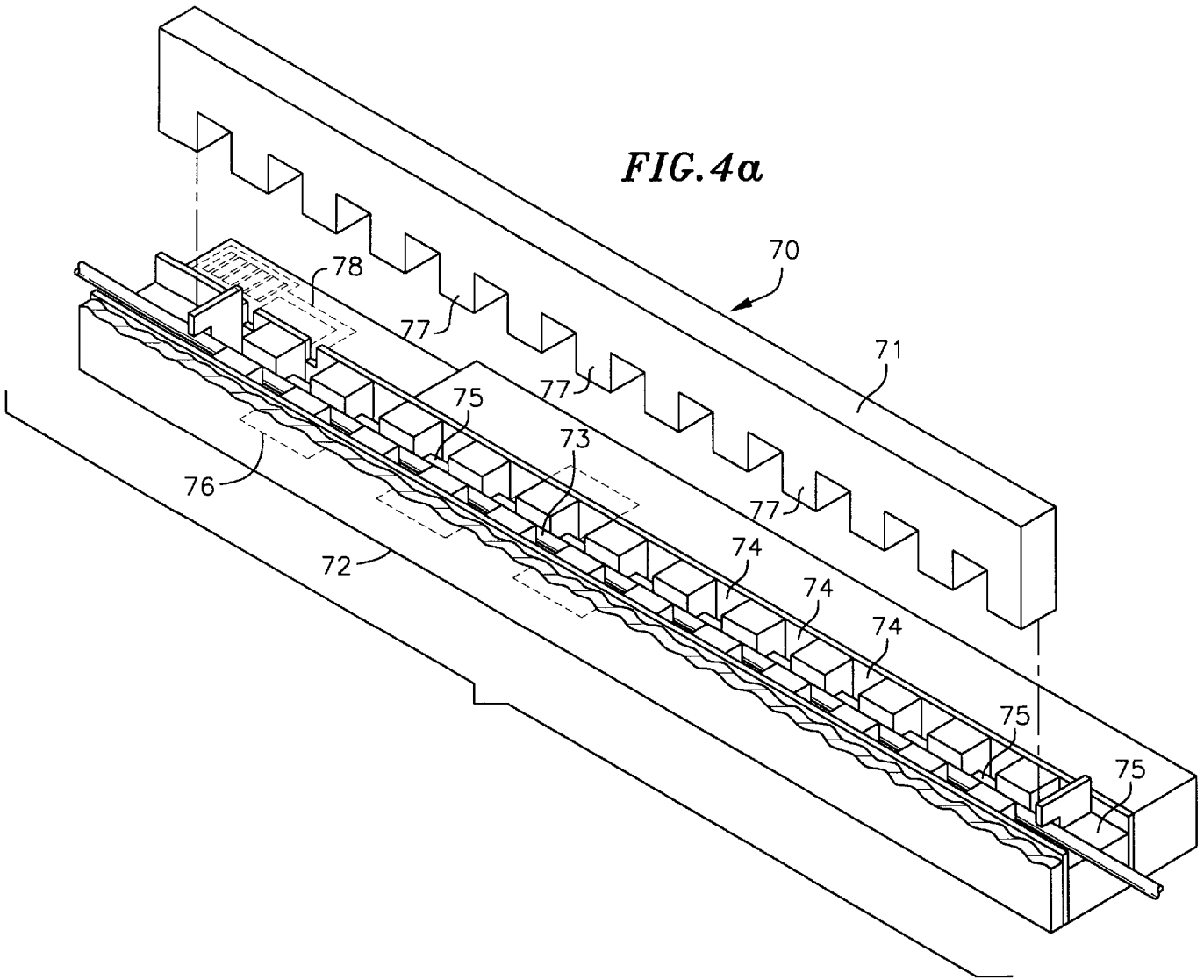
FIG. 4*a* is a semi-schematic perspective view of top and bottom platens of a heat sealing devices provided in accordance with practice of the present invention for mounting on to a commercially available heat sealer.

Turning now to FIG. 4*a* there is depicted in semi-schematic view, a specific embodiment of a sealing device 70, which is useful for providing thermal-compression heat seals at uniform spaced-apart intervals, so as to form pouches of specific desired sizes, or to isolate linked-together Y-sites into individual sample-containing aliquots. The sealing device 70 suitably comprises top and bottom platens 71 and 72, respectively, adapted to be mounted along the pressure lever end seal band, respectively, of a commercially available impulse heat sealer, Such as one of the ALINE M-series impulse sealers, manufactured and sold by the ALINE Company of Santa Fe Springs, Calif. The specific embodiment illustrated in FIG. 4*a* is a two-part heat sealing head adapted to be attached to an ALINE MC-15 impulse heat sealer as an after market modification and is adapted to allow the MC-15 to produce pre-filled sample aliquot containers of blood or plasma for further processing in accordance with the system and method of the present invention.

The bottom platen 72 of the heat sealing head 70 is constructed of a suitable rigid, heat resistant material such as a glass fiber phenolic material manufactured and sold by many various commercial manufacturers. In the illustrated embodiment, the bottom platen 72 is preferably about 15 inches in length in order to fit on the mounting surface of the MC-15 impulse heat sealer. The bottom platen 72 is shaped to define a longitudinal slot 73 which is centrally disposed and runs along the entire length of the bottom platen 72. The width of the longitudinal slot 73 is approximately 0.2 inches in order to accommodate standard, flexible, plastic medical tubing which typically is constructed with an outer diameter of approximately 0.1875 (3/16) inches, in nested fashion along the length of the slot.

A plurality of transverse slots 74 are disposed at spaced-apart intervals along the length of the bottom platen 72 and are oriented in a direction orthogonal to that of the central longitudinal slot 73. The transfer slots 74 are constructed with a width of approximately 0.5 inches and are located on 1.125 (1 1/8) inch centers. Each transverse slot is, therefore, separated from its neighbors by a residual block of platen material which is about 0.625 (5/8) inches in width and which includes a central channel defined by the central longitudinal slot 73.

Both the longitudinal and transverse slots 73 and 74, respectively, are cut only partially through the material of the bottom platen 72, and are cut to the same depth, thereby forming a substantially flat bed 75 which defines the bottom surface of both the longitudinal and transverse slots. When the apparatus is used to form heat seals, a length of 0.1875 (3/16) diameter standard medical tubing is nested in position along the longitudinal slot 73 and rests on the bed 75 of the bottom platen which functions as a pressure bearing surface when the apparatus is operative to form heat seals.

A heating element 76, such as nickel-chromium (NiCr) resistive wire, is disposed lengthwise along each transverse slot comprising the bottom platen and is threaded along the platen in a snake-fashion from slot to slot in about the center of each slot. Where the heating element 76 traverses the center of each transverse slot 74, the NiCr wire is protected from contacting the thermal-sensitive plastic tubing by covering the wire with a piece of, for example, Teflon® tape. Blood or plasma samples contained in the aliquot containers formed in the sealing device during the seal process are thus protected from the high temperatures of the heat seal and thermal degradation of the samples is minimized.

In the illustrated embodiment of FIG. 4*a,* the top platen 71 is also approximately 15 inches in length and is coupled to the pressure lever of the MC-15 heat sealer. The spatial orientation of the pressure lever suspends the top platen 71 over the bottom platen 72 in a fixed geometrical relationship. The top platen 71 is constructed from a heat-resistant plastic material such as a milled glass fiber phenolic material and comprises a set of equidistant spaced-apart, generally rectangular teeth protruding from its bottom surface and which extend in a direction pointing toward the bottom platen. Each of the teeth 77 are about 0.5 inches in length and are spaced-apart on 1.125 (1 1/8) inch centers. Accordingly, it can be seen that each of the teeth 77 is dimensioned to fit in to the cavity defined by the transverse slots 74 of the bottom platen 72. Each of the teeth 77 of the top platen 71 is positioned to be suspended over a corresponding intersection of a respective transverse slot 74 and the longitudinal slot 73 of the bottom platen 72. Thus, each tooth 77 is configured to fit into the cavity thus defined when the heat sealed platens are closed together by operation of the MC-15 device.

After a sample aliquot container is placed within the longitudinal slot 73, the top platen 71 is forced into contact with the bottom platen 72, by lowering the lid of the MC-15 heat seal apparatus. As the lid is lowered, the teeth 77 of the top platen 71 enter the cavity defined by the transverse slots 74 of the bottom platen 72. Each tooth contacts that portion of a tubing segment which lies exposed on the bed 75 at the intersection of each transverse slot 74 with the central longitudinal slot 73. A direct current is provided to the nickel-chromium resistive heating wire which causes the wire to heat-up, in turn causing the plastic material of the tubing segment to soften. At the same time, the top platen 71 is compressed onto the bottom platen thus applying pressure to the plastic material being softened by the heating element 76.

After heat sealing, the sample aliquot container is labeled on at least one end with a unique identifier that identifies and corresponds to the original blood or plasma donation. Labeling may be achieved by, for example, affixing a label onto the segment or by imprinting a bar coded emblem directly on to the tubing material. In accordance with the invention, a prepared recess 78 is suitably provided on the heat sealer 70 for receiving, holding and aligning a pre-printed bar code identifier tag. Such a tag is formed from a suitable heat-sealable material and is heat sealed to an appropriate tubing segment of the sample aliquot container at the first heat seal position for identification purposes. The sample aliquot container, whether in the form of pouches or linked-together Y-sites, is then frozen for preservation.

Returning to FIGS. 3*a,* 3*b,* and 4, it may be desirable for each individual sample aliquot container along a segment to be identified by an alpha or numeric code which identifies the position of the container along the length of the original segment. Such a code may be imprinted, for example, on the compressed portion of the seal pad located between adjacent containers by use of a stamping dye. Such a stamping dye may comprise an integral part of the sealing device as depicted in FIG. 4, so that sealing, forming containers of various sizes, and providing narrow or perforated areas for easy separation, as well as identification indicia, are all accomplished in a single efficient step. Alternatively, the alpha or numeric identifier could comprise part of a perforating jig or dye. Stamping dyes are well known commodities many of which include means for advancing the alpha or numeric character to a next sequential one such that sequential containers in the tubing segment are each identified by a corresponding sequential string of alpha (a, b, c, . . . ) or numeric (1, 2, 3, . . . ) characters.

Therefore, if a first generational testing pool is to be prepared from sample pouches or Y-sites from several donations, the quality control check may be performed by confirming that all pouches or Y-sites to be pooled from each tubing segment have the same location code, for example, number 1. Likewise, when preparing a second generational testing pool from samples of the same donations, a quality control check may be performed by confirming that all pouches or Y-sites to be pooled from each tubing segment have, for example, the numeral 2 imprinted at some point on the compressed portion of each corresponding flexible tubing segment.

Pool Formation

In order to effect efficient PCR testing of a donation, the serology test sample taken from each individual donation in the test container (28 of FIG. 1) is first tested for various known antigens and/or antibodies which are designated for specific viruses. If a sample tests positive for one or more known antigens or antibodies, the individual donation and its corresponding tubing segment are excluded from further testing and both may be disposed of in an appropriate manner.

Tubing segments which correspond to the remaining serology negative donations are divided into identified groups, with each group comprising a selected, predetermined number of donations. As will be described further below, the number of donations (tubing segments) per group is determined by the sensitivity by the specific high-sensitivity tests (such as a PCR test), the anticipated concentration of the viral RNA or DNA of interest in the blood or plasma sample, and the anticipated frequency of a PCR positive sample occurring within the general donor population. For example, it would be appropriate to pool samples of between 100 and 700 individual donations, for the detection of the hepatitis C virus, containing the RNA of interest, in a population of repeat plasma pheresis donors. For a population in which a viral contamination occurs more often, smaller pools of between 50 and 100 individual donations may be appropriate.

Figure 5:
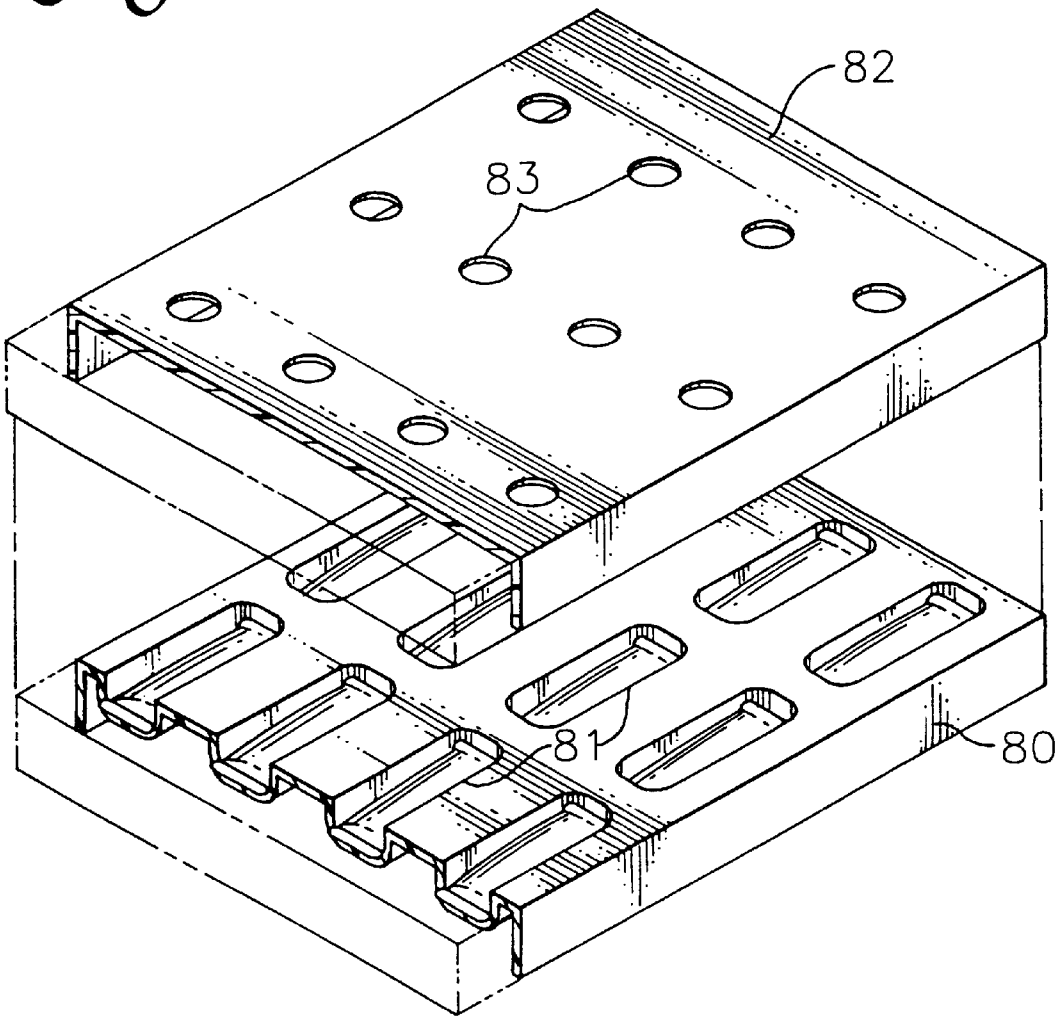
FIG. 5. is a semi-schematic perspective view of a sampling plate and cover provided in accordance with the present invention.

One embodiment of a process for preparing a PCR testing pool in accordance with the present invention will now be described in connection with FIGS. 5 and 6. A sampling grid or plate, generally similar in application to a titer plate but configured in accordance with practice of the invention, is illustrated generally at 80. The sampling plate 80, illustrated in FIG. 5, is configured to contain generally hemi-cylindrical sample wells 81 disposed horizontally on the plate in a generally regular array. A suitable sampling plate used to practice the method of the invention has 64 such sample wells arranged in an 8×8, row/column, regular rectangular fashion. A cover plate 82 having approximately the same exterior dimensions as the sampling plate 80 is also provided. The cover plate 82 is adapted to cover the surface of the sampling plate 80 in close-fit attachment. Through-holes 83 are arranged on the cover plate in the same regular array fashion as are the sample wells 81 of the sampling plate 80. When the cover 82 is placed over the surface of the sampling plate 80, through-holes 83 line up vertically over the sample wells 81 and are in registration therewith. It will be seen that the through-holes 83 provide a means for effecting communication with the sample wells 81 of the sampling plate 80 through the material of the cover plate 82. In accordance with practice of the invention, the diameter of the through-holes 83 are made substantially smaller than the circumferential area foot print of each of the corresponding sample wells. However, the through-hole diameter is made sufficiently large to permit a needle or other cannula-like object to pass through the holes and enter into communication with the sample wells below.

In the illustrated embodiment of FIG. 5, the sample wells 81 of the sampling plate 80 are constructed to have an aspect ratio suitable for receiving a sample aliquot containing pouch 84 of the type described in connection with the embodiment of FIG. 2. The sample aliquot containing pouches 84 are each horizontally oriented and nested in a corresponding sample well 81, which functions to retain a pouch 84 in its horizontal orientation and generally restrict the pouches movement once the pouch is contained within.

Accordingly, it should be understood that the shape and dimensions of the sample wells 81 are intended to provide a generally mirror-image receptacle for holding and restraining therein a particular one of the various embodiments of sample aliquot containers. It will be understood by those having skill in the art that were the flexible tubing pouches to be replaced by a sample containing Y-site, the configuration of the sample wells 81 would be changed accordingly. For example, rather than being oriented horizontally, so as to expose a large pouch surface area to an extraction needle, sample wells configured to host a Y-site may well be oriented vertically, with a high aspect ratio, in effect describing a deep, narrow hole. The outlet end of each Y-site (54 of FIG. 2*a*) would be inserted into the hole which would support the Y-site in an upright orientation, with the septum of its access site (55 of FIG. 2*a*) in registration with, and just beneath, the through-holes 83 of the cover plate 82. A needle or other cannula like object is then passed through the through-holes 83 to engage and/or pierce the septum of the Y-site, thus making fluid communication with the blood or plasma sample within. Accordingly, although the invention of FIGS. 5 and 6 is depicted and described in terms of sample aliquot containing pouches, it will be understood by those having skill in the art that the description is equally applicable to sample aliquot containing Y-sites with only minor modifications.

Figure 6:
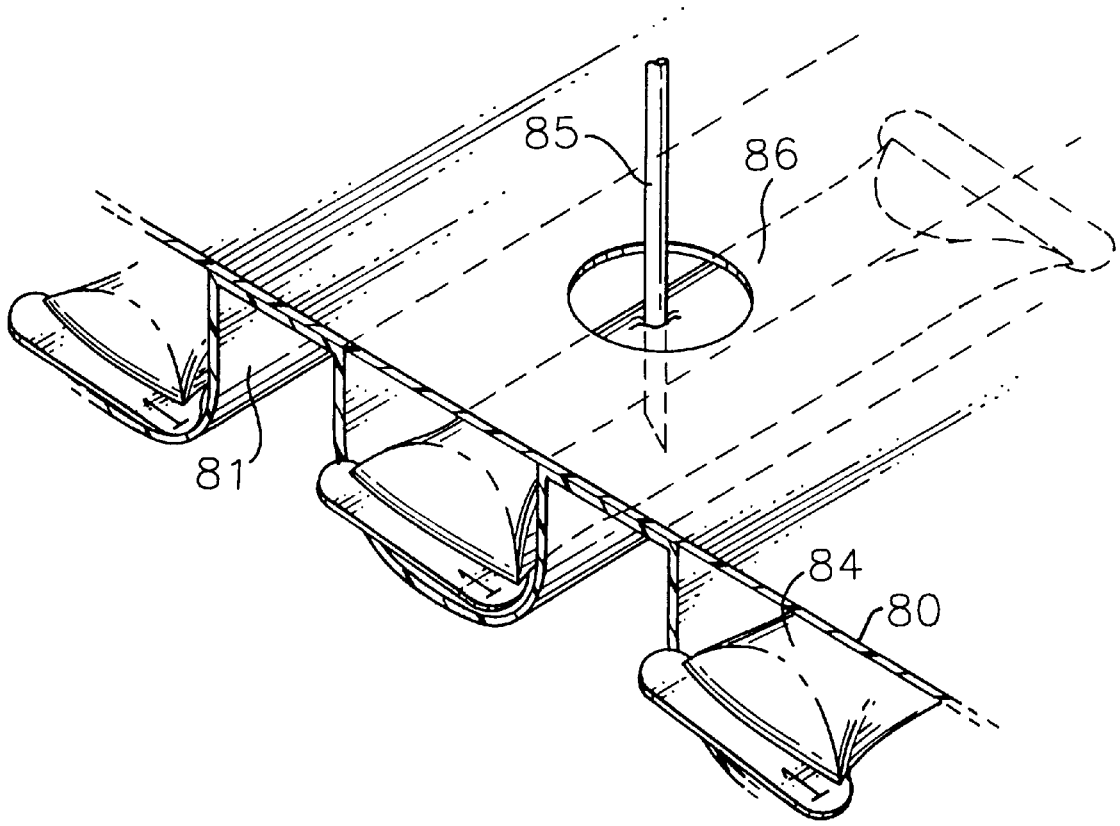
FIG. 6 is a semi-schematic partial cross-sectional view of a plasma pouch contained in a sampling plate sample well provided in accordance with the present invention.

As shown in connection with FIG. 6, a terminal (first generation, "number 1") pouch 84 is removed from each tubing segment that has been identified as belonging to a particular PCR group to be tested. Each terminal pouch 84 is washed, but not opened, and placed in a corresponding sample well 81 of the sample plate 80. The cover plate 82 is secured over the top of the sampling plate 80 and the plate, cover, and pouches are placed at an appropriate ambient temperature so that the pouches, and the samples within, are thawed.

An equal volume of between about 0.02 to 0.5 milliliters of plasma is removed from each pouch and combined in a pool in a testing container. A needle 85 or other cannula like device is inserted through the through-hole 83 in the cover plate 82 and into the sampling plate sample well directly below and in registration with the through-hole. The needle pierces the flexible tubing material of the sidewall of the pouch, thereby gaining access to the blood or plasma sample contained therein. In a manner to be described in greater detail below, the needle of an exemplary embodiment of the invention is connected to a device that provides a continuous vacuum or suction to extract all of the blood or plasma contained in the pouch while minimizing any leakage of fluid into the surrounding tray. The needle may be coupled to a device which causes the needle to move through the through-hole and pierce the tubing material of the pouch sidewall, but restricts the needle's further downward progress such that the needle is prevented from touching or piercing the bottom wall of the pouch as the pouch sits in the sample well.

Because the diameter of the through-holes 83 is substantially smaller than the circumferential surface area of the sample wells 81, and necessarily the surface area of a pouch 84, the cover plate material 86 surrounding the through-hole restricts the passage of a sample pouch through the through-hole when the needle is withdrawn from the pouch after extracting a sample. Accordingly, as depicted in FIG. 6, the cover plate material 86 surrounding the through-hole prevents accidental withdrawal of the pouch along with the needle.

The foregoing process is repeated for each pouch (or Y-site) populating the sample plate 80. The sample aliquot of blood or plasma is removed from each pouch and deposited in a pooling or testing container until all of the sample aliquots have been withdrawn from all of the pouches populating the plate. The sum of each of the sample aliquots of the terminal (first generation, "number 1") pouches now defines a first generational pool.

While the method of preparing a PCR test pool has been described in terms of manually extracting a sample by inserting a needle or cannula individually into each sample well, the method may equally be practiced using a automated or "gang" process. An array of needles or cannulas, configured in a manner corresponding to the arrangement of through-holes in the cover plate, may be suspended over the sampling plate and pressed-down onto the sampling plate thereby allowing all of the sample pouches to be pierced and samples extracted therefrom in a single operation. Alternatively, a single needle, cannula or cannula holding device may be automated or programed to successively pierce and withdraw fluid from each sample aliquot container. In order to prevent carry over contamination, the needles or cannulas are sterilized or replaced such that a clean or sterile needle or needle array is used to withdraw samples for each generational pool.

In addition, it will be evident to one having skill in the art that a combination a of sampling plate, sample wells, cover, through-holes, and needle or cannula, while described in connection with extracting sample fluid from a sample pouch, is equally applicable to extracting sample fluid from the Y-site sample aliquot containers of FIG. 2*a*. As was discussed above, the configuration of the sample wells 81 of FIGS. 5 and 6 are determined by the shape of the sample aliquot container, and only minor modifications are required to reconfigure them for Y-sites. For example, while Y-site sample wells have been described as a vertically oriented, high aspect ratio, cylindrical hole into which each Y-site is inserted, a notch may further be provided at some appropriate location about the upper periphery of each Y-site sample well and which functions as a detente stop into which the Y-sites branch port (56 of FIG. 2*a*) may be positioned. This detente stop functions to uniformly orient each Y-site and to provide additional positional security against inadvertent rotational movement. In the same manner as described in connection with FIGS. 5 and 6, blood or plasma sample fluid may be extracted from each Y-site by inserting a needle or cannula through each Y-site's access port and into fluid communication with the sample. As the needle or cannula is removed from the access port, the cover plate material surrounding each through-hole would also act as a restraining stop to prevent the Y-site from being withdrawn from the sample well along with the needle or cannula.

Figure 7:
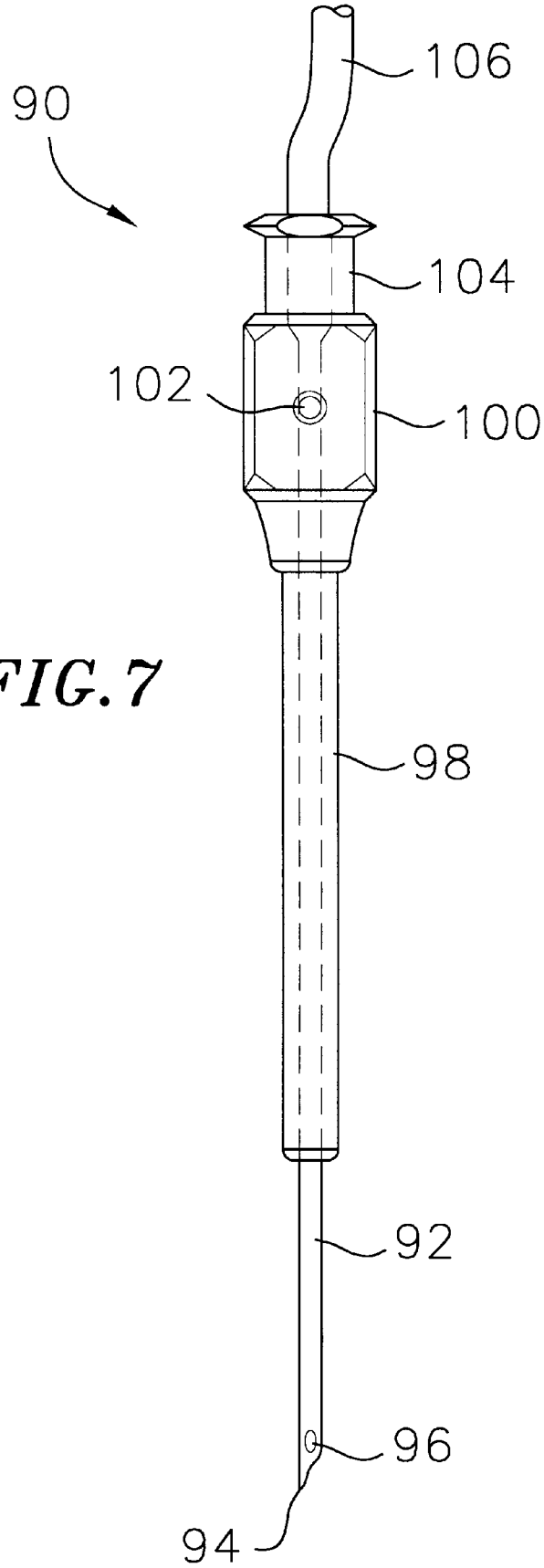
FIG. 7 is a semi-schematic view of an embodiment of a vented autosampler needle provided in accordance with the present invention.

Prior to describing the construction and operation of an automated sample extraction system or alternatively, a "ganged" extraction system, it will first be necessary to describe the construction and operation of an autosampler needle or cannula useful for practice of principles of the invention. Turning now to FIG. 7, one embodiment of an autosampler needle in accordance with the invention is indicated generally at 90 and functions on one hand to provide a pressure equalization channel for venting a sample aliquot container, or alternatively, to pressurize a sample aliquot container and force a specific volume of the sample contents out of the container and into for example, a collection column. The autosampler needle 90 suitably comprises a generally tubular piercing member 92 constructed of a rigid generally inert material such as stainless steel and which terminates at its distal end in a "sharps" 94 suitable for piercing either the flexible plastic wall material of a sample pouch or the septum of a Y-site access port. The piercing member 92 is thus similar to a hollow needle. The piercing member's through bore may continue all the way to the sharps 94 at its distal end or alternatively, the distal end may be closed off and an orifice or orifices 96 may be provided in a region proximate to the distal end to allow communication with the interior bore of the piercing member 92.

Although the piercing members has been described in terms of a "sharps", preferably it is constructed with a conventional deflected, non-coring tip such that the piercing member may be inserted into a variety of pierceable materials and/or septums without coring the material and thus forming a dangerous leakage path between potentially contaminated fluid and the ambient environment. In addition, a non-coring tip prevents entry of the cored piece of pierceable material from entering the piercing member, thereby plugging up the bore. The piercing member 92 is surrounded by a shroud 98 disposed coaxially with a piercing member and extending at least partially along the length of the piercing member. The shroud 98 is likewise formed as a hollow tube of a suitable non-reactive material such as stainless steel. The shroud 98 surrounds and extends along the length of the piercing member toward the sharps 94 and is rounded-off, or blended, at its distal end, i.e., is curved inwardly towards the outer cylindrical surface of the piercing member 92. The blend at the distal end of the shroud 98 provides for a smooth transition between the smaller outer diameter of the piercing member 92 and the larger outer diameter of the shroud 98. Accordingly, the autosampler needle 90 may be inserted, along its entire length, into a pierceable container with relative ease. The shroud 98 is further coupled, at its proximal end, opposite the blended end, to a vent chamber 100 which includes a gas or air vent fitting 102 by which the vent chamber is enabled to be either opened to ambient atmosphere or alternatively, to be connected to a pressurized gas source, such as a nitrogen cylinder, through a pressure regulator.

From the illustrated embodiment of FIG. 7, it will be seen that the body of the piercing member 92 extends through both the shroud 98 and vent chamber 100, to terminate in a hose fitting 104 to which a length of non-reactive standard medical tubing 106 may be affixed in any one of a variety of well known ways. Once the tubing 106 is attached, the tubing and piercing member define a first fluid channel through which blood or plasma may be extracted from a sample aliquot container. The sharps 94 of the piercing member 92 first engages either the side wall (or top) of a sample pouch or the septum of a sample containing Y-site and pierces the material of the container. As the autosampler needle 90 is further inserted, the distal end of the shroud 98 also enters the container and thereby introduces a potential pressurization or vent path to the interior of the sample aliquot container. If it is desired to open the vent fitting 102 to the ambient atmosphere, the vent chamber 100 and shroud 98 function to provide air to vent the sample container while the blood or plasma sample may be aspirated from the container through the piercing member 92 using a vacuum source connected to the tubing 106.

Alternatively, the vent fitting 102 may be connected to a pressurized gas source such as nitrogen which pressurizes the sample container through vent chamber 100 and shroud 98, thus forcing the blood or plasma sample through either the end of the needle or the communication orifices 96, up the hollow piercing member 92 and out through the tubing 106 into a sample collection column.

It should be understood from the foregoing that the dual-channel auto sampler needle 90 of the present invention need not be configured precisely as illustrated in FIG. 7. Indeed, rather than having a coaxial relationship, the fluid communication channel and the pressurization or venting channel may be provided as two needles disposed side by side. In an alternative embodiment, the shroud 98 which cooperates to form the pressurization or venting channel may be extended so as to cover the distal end of the piercing member 92 and the shroud itself may be formed with a sharps to effect piercing of either a sample pouch or the septum of a sample aliquot containing Y-site.

The autosampler needle 90 may equally be configured with the pressurization or venting channel defining the inside tube, while the aspiration or sample extraction channel may be defined by the shroud. Regardless of how constructed, an important feature of an autosampler needle in accordance with the present invention, is that dual channels are provided in a single apparatus; a first channel through which sample fluid is extracted (either by vacuum or internal pressure), and a second channel by which gas is introduced (either pressurized or under ambient pressure).

Figure 8:
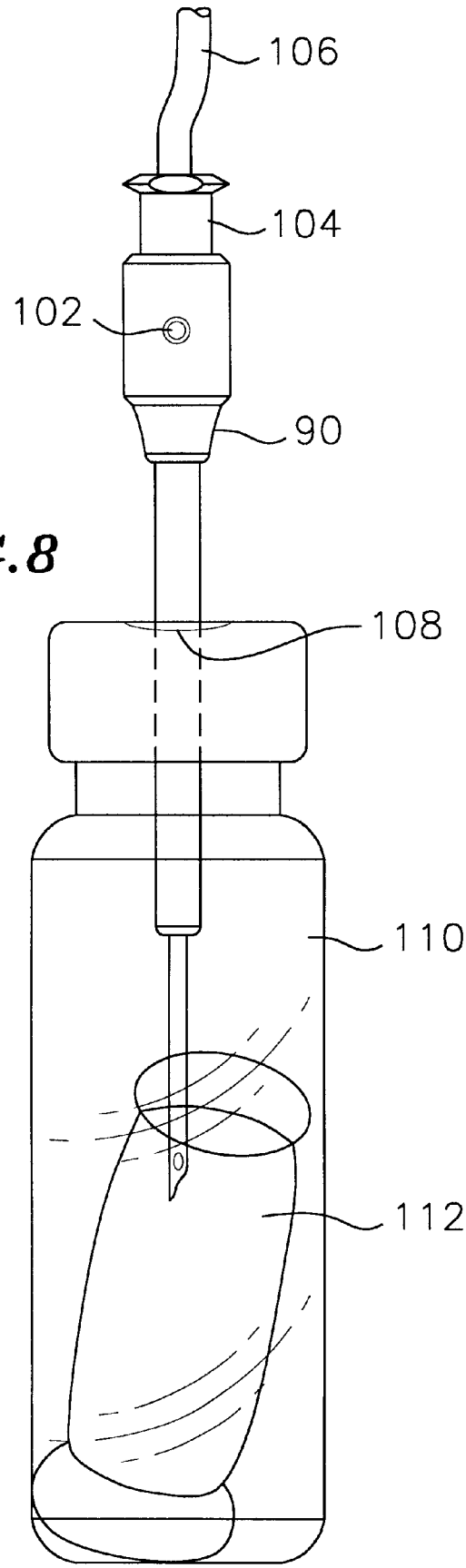
FIG. 8 is a semi-schematic partial cross-sectional view of the vented autosampler needle of FIG. 7 inserted into an autosampler vial in accordance with the present invention.

The manner in which the autosampler needle 90 of FIG. 7 functions when extracting a blood or plasma sample from a sample aliquot container may be best understood with reference to FIG. 8. In FIG. 8, the autosampler needle 90 is depicted after insertion through a frit or septum 108 of a conventional autosampler vial 110 which contains a sample pouch 112 of the type described in connection with FIG. 2. In FIG. 8, the vent fitting 102 is coupled to the atmosphere through a 0.2 micron filter to provide thereby a vent path into the autosampler vial 110 and the sample pouch 112. The sample is extracted by applying a vacuum to the standard medical tubing 106.

Figure 9:
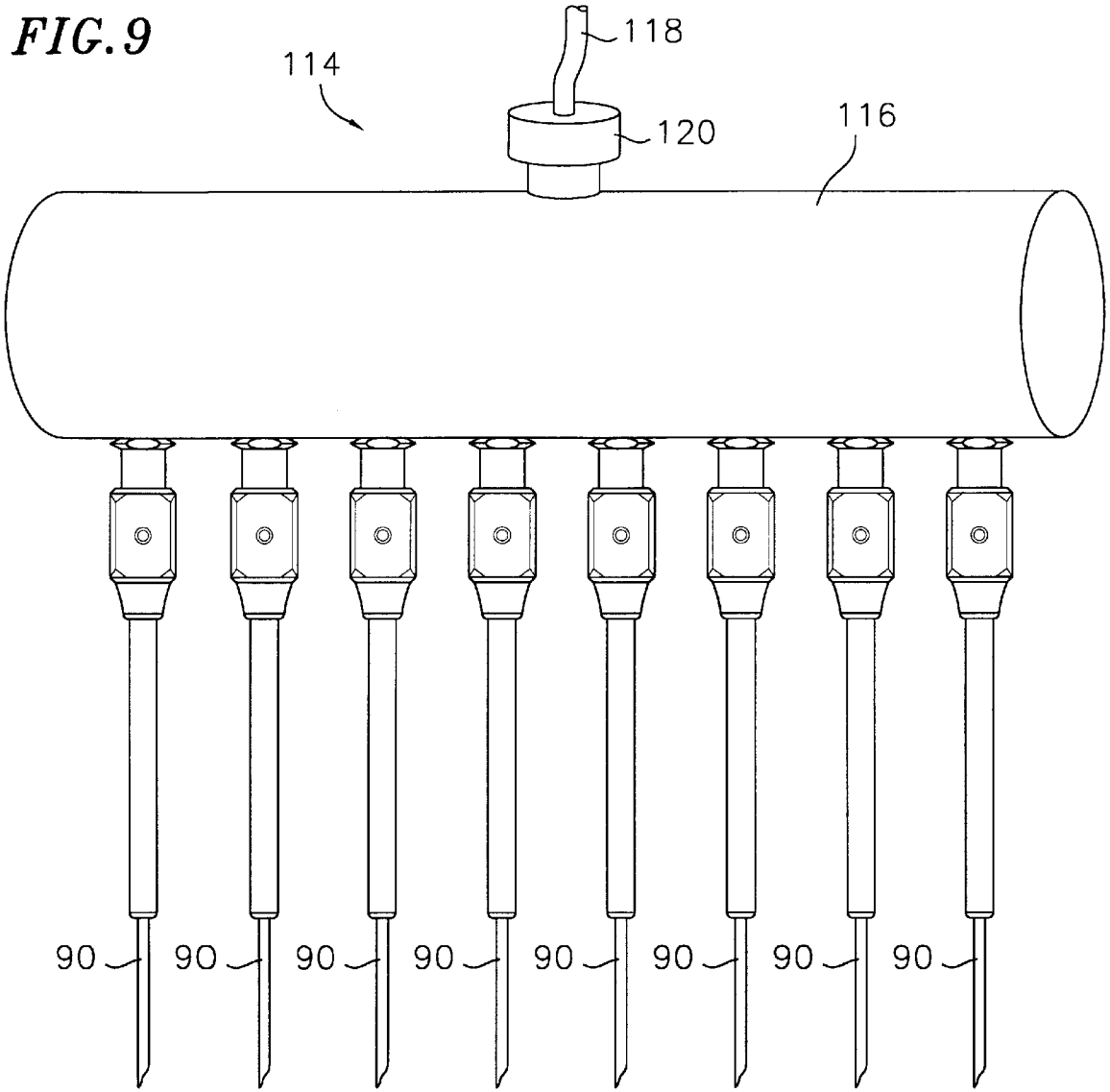
FIG. 9 is a semi-schematic perspective view of a linear array of the autosampler needles of FIG. 7 connected to a pooling manifold in accordance with the present invention.

Turning now to FIG. 9, it will be seen that the autosampler needle 90 is particularly suitable for use in a "ganged" sample extraction apparatus indicated generally at 114. The extraction apparatus 114 suitably comprises a central hollow generally tubular manifold 116 which is connected to a vacuum source by a conventional vacuum tubing 118 connected to a vacuum fitting 120. A regular, linear array of autosampler needles 90 are connected so as to protrude from the bottom of the manifold 116 in a manner similar to a comb. Each autosampler needle is spaced-apart a predetermined distance from the next, which distance is determined by for example, the through-holes spacing of a cover plate such as is depicted in FIG. 5. In the illustrated embodiment of FIG. 9, the manifold 116 is illustrated as supporting 8 autosampler needles and may be thus seen to be eminently suitable for use with a 64 element (8×8) titer plate of the type described in connection with FIG. 5 above.

The manifold 116 may be connected to a suitable mechanical system so that the manifold 116 can be positioned so as to put the autosampler needles 90 into registration with a row of through-holes of the titer plate cover. Subsequently lowering the manifold 116 will cause all of the autosampler needles to enter the through-holes, penetrate either the plastic side wall material of a sample pouch or the septum of a sample-containing Y-site, and open a fluid communication channel with the sample aliquot containers in a single operation. Once the auto sampler needles 90 have penetrated the sample containers, vacuum is applied to the vacuum hose 118, causing the blood or plasma samples to be drawn up through the autosampler needle and into the manifold 116 for collection.

In accordance with practice of the present invention, each autosampler needle's vent fitting 102 is left open to the ambient atmosphere to provide thereby a vent.

An alternative embodiment of a "ganged" sample collection apparatus may be readily obtained by providing a pressurization manifold to which each of the autosampler needle's vent fittings are coupled. The pressurization manifold may be connected to a pressurized gas source in the same manner that the manifold 116 of FIG. 9 is connected to a vacuum source, i.e., by a conventional gas fitting and tubing. Following insertion of the autosampler needles into a multiplicity of sample containers, the pressure manifold may be pressurized, which causes a build up of internal pressure in each sample container, thus forcing the blood or plasma samples up the fluid communication channel of the autosampler needle and into the collection manifold.

Regardless of whether the equalization system is provided in a vent mode or a pressurization mode, the "ganged" extraction apparatus allows blood or plasma samples to be harvested from a multiplicity of sample containers in a single operation. Once the samples are extracted from the containers comprising a first row of an 8×8 titer plate, the manifold 116 is raised causing the autosampler needles in turn, to be withdrawn from the sample containers of the first row. The apparatus is next indexed to the for example, second row of the 8×8 sample plate matrix and the extraction process is again performed on the containers comprising the second row. The process is repeated until blood or plasma samples have been extracted from all of the sample containers comprising all, for example, 8 rows of the sample plate. The autosampler needles 90 are then either replaced with new, uncontaminated needles or the apparatus may be indexed to a bleach container for cleaning and decontamination, prior to being used to extract samples from additional 64 element plates.

Figure 10:
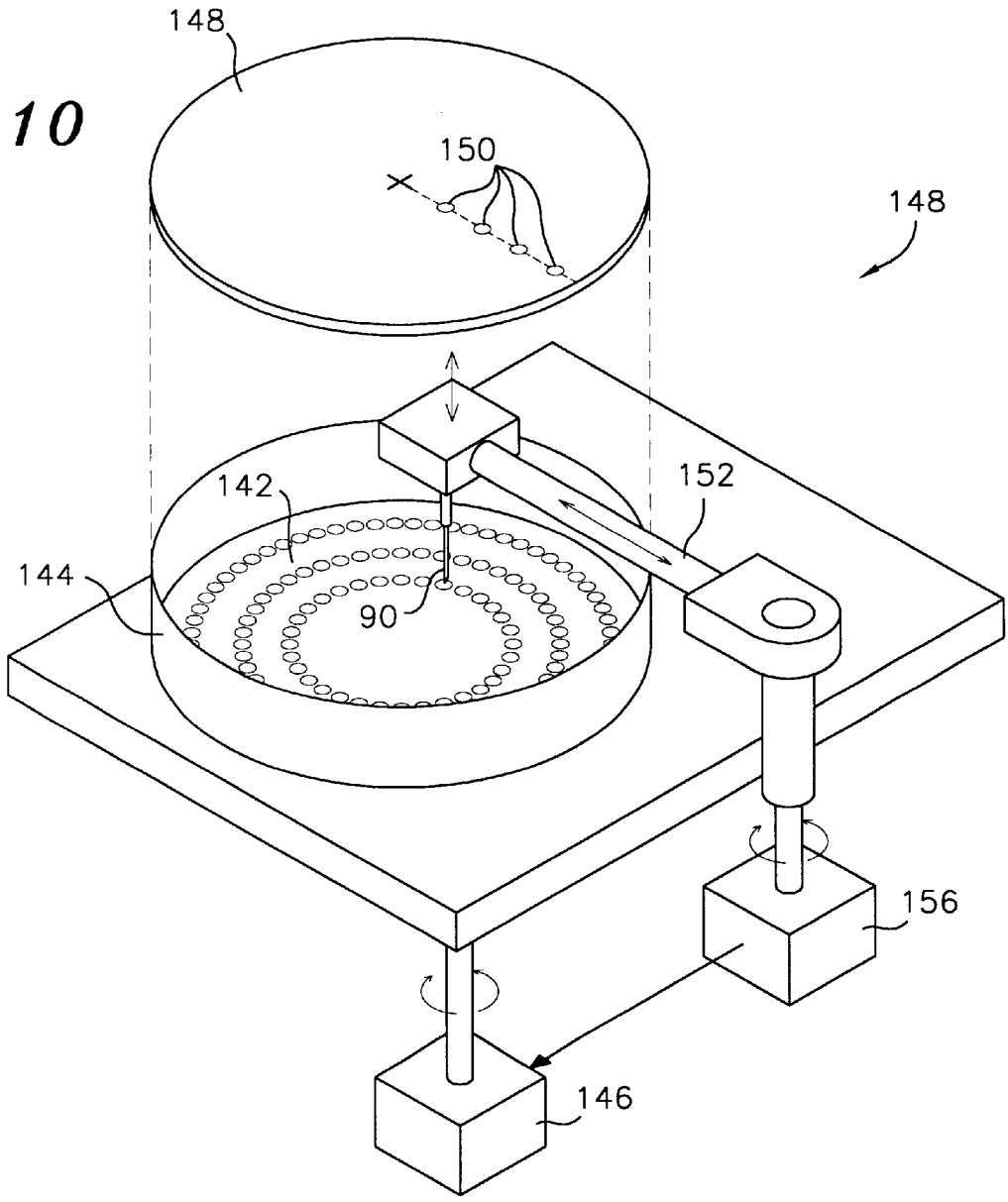
FIG. 10 is a semi-schematic view of a robotic automated sampling and pooling apparatus provided in accordance with the present invention.

Turning now to FIG. 10, in accordance with practice of principles of the invention there is depicted an autosampler system, indicated generally at 140, suitable for fully automated collection of blood or plasma samples for pooling. Briefly, the autosampler 140 comprises a closed container which is able to host multiple sample pouches or Y-sites for easy access by for example, a single robotically controlled autosampler needle 90 or multiple autosampler needles disposed along a manifold. In the embodiment depicted in FIG. 10, sample containers are arranged in a circular wheel configuration termed a carousel 142 which is mounted within a closed container 144 and which can be rotated within the closed container by being coupled to an external motor 146. The container 144 is closed-off from the ambient environment by a cover 148 which forms the top surface of the container 144 and overlies the carousel 142. A port 150 is provided in the cover and is arranged to be in vertical registration with the circumferential path followed by the sample containers, as the carousel 142 is rotatably moved by the motor. The port 150 is a generally circular opening circumscribed by an O-ring seal and is dimensioned to receive the tube coupling collar (104 of FIG. 7) of an autosampler needle 90 therethrough. The O-ring seal engages and is compressed around the peripheral surface of the needle's collar 104, thus gasketing the port 150 so as to maintain a self-contained environment within the container 144. In like fashion, a gasket is provided between the cover 148 and the container 144, such that when the cover is put into place, the interior volume of the container 144 forms a self-contained environment.

The collar portion 104 of the autosampler needle 90 which protrudes the gasketed port 150 is in turn, coupled to a cantilevered robotic arm 152 which is configured to move up-and-down in a vertical direction, in response to manual, mechanical, or electronic control. Vertical motion of the robotic arm 152 causes the autosampler needle 90 to move up-and-down in response thereto. As the carousel 142 is rotated inside of the closed container 144, each of the sample containers mounted on the carousel are indexed to a position immediately below the autosampler needle. In response to motion of the robotic arm 152, the autosampler needle is lowered to thereby pierce the sample container, and the blood or plasma sample is aspirated from the container while air is provided for venting as needed.

Following sample extraction, upward vertical motion of the robotic arm 152 withdraws the autosampler needle 90 from the now empty sample container. The carousel 142 is now rotatably moved by the motor 146 to index the next sample container to a position immediately beneath the autosampler needle. The piercing and extraction process repeats, and the blood or plasma sample is collected through conventional medical tubing in a pooling container.

It can be seen that the autosampler apparatus 140 of FIG. 10 is particularly suitable to be adapted to electronic control by for example, a computer or digital signal processor. A computer (command processor) 154 is programmed to provide appropriate direct current motor driver command signals to the motor 146, thereby causing the motor to rotate the carousel 142 through a precise and pre-determined arcuate range. Computer control of the motor driven carousel 142 thus ensures the accurate indexing and positioning of each successive sample container beneath the gasketed access port 150 and thus the autosampler needle 90. Once the computer 154 has commanded the motor 146 to index the carousel 142 to the appropriate arcuate position, the computer 154 next commands the robotic arm 152 to move vertically downward a specific predetermined distance, thus causing the autosampler needle 90 to pierce the sample container. Limiting the range of motion of the robotic arm 152 may be easily controlled by any one of a variety of well known methods. For example, the robotic arm may be positioned by a stepper motor operating in response to a signal pulse train issued by the computer 154. The magnitude of any excursion caused by such a stepper motor would necessarily be proportional to the number of pulses forming the signal pulse train. In order to precisely move the robotic arm 152 a specific amount, the computer 154 need only issue a specific number of movement command pulses to the stepper motor in order to ensure consistency and repeatability of motion.

Alternatively, the robotic arm 152 may be moved in response to hydraulic pressure, and its range of motion constrained by pre-set, mechanical crash stops. In the case of such a simple mechanical system being used to constrain the robotic arm's range of vertical motion, the robotic arm may even be manually operated. Once the carousel 142 has indexed a sample container beneath the autosampler needle, an operator could easily push down on the arm causing the needle to pierce the sample container. The operator could then activate a switch, turning on a vacuum which would extract the sample fluid from the sample container. Spring-loading the arm 152 would allow the arm to move vertically upward in response to spring pressure once the operator removed the downward pressure on the arm. This would cause the autosampler needle to be withdrawn from the sample container and allow the carousel 142 to be rotatably moved to index a next sample container to the extraction position beneath the autosampler needle 90.

A further modification may be made to the autosampler 140 of FIG. 10 in order to improve its effectiveness in extracting multiple blood or plasma samples from a multiplicity of sample containers and forming a pool therefrom. In particular, the carousel 142 may be provided with sites for holding sample containers with the sites arranged in 8 concentric circular arrays. The carousel 142, container 144, and cover 148 would necessarily be scaled-up to accommodate the additional sample containers. A manifold, including 8 autosampler needles, configured in a manner similar to the apparatus of FIG. 9, is coupled to the robotic arm 152 in place of the single autosampler needle 90 of FIG. 10. Necessarily, the cover 148 is provided with 8 gasketed access ports, to accommodate the 8 autosampler needles of the manifold. Otherwise, the 8-up auto sampler operates in precisely the same manner as was described in connection with the embodiment of FIG. 10. The 8-up manifold is moved vertically up-and-down in response to operation of a robotic arm, and the 8 autosampler needles of the manifold move together to pierce and extract the blood or plasma samples from 8 sample containers in a single operational step. Following sample extraction, the robotic arm raises the manifold, including the needles, and the carousel indexes to bring the next 8 sample containers into registration with respective autosampler needles. The foregoing process is repeated until blood or plasma samples have been extracted from all of the sample containers populating the carousel.

From the foregoing, it will be evident to one having skill in the art that a computer or command processor controlled autosampler apparatus of the type described above, allows harvesting of blood or plasma samples from a great number of sample containers in a minimal amount of time and with minimal exposure of potentially dangerous viral contaminated fluid to an operator. The number of sample containers able to be accessed by such an apparatus is limited primarily by the scale of the device and the speed of the mechanical indexing system which controls the robotic arm and the rotating carousel motor. Accordingly, large scale pools comprising up to several hundred samples can be formed by a very few operational cycles of the autosampler of the present invention. This would provide a significant reduction in pool formation time over a method in which, for example, 500 sample containers were individually accessed by a needle or cannula to harvest the samples therefrom.

In addition, it will be apparent to one having skill in the art that a single large scale pool, comprising up to 512 samples or more, can be formed by an autosampler apparatus scaled sufficiently large enough to accommodate this number of sample containers in sites on the rotating carousel. The accessing manifold and the number of autosampler needles would also be increased to accommodate the greater number of sample containers. Alternatively, the cover 148 may be dispensed with and the robotic aim may be programmed to move a single autosampler needle horizontally, as well as vertically. This configuration would be particularly advantageous if all of the sample container sites on the carousel were not filled with a sample container. The computer or command processor could then be easily programmed to have the robotic arm cause the autosampler needle to access only those sites in which a sample container is present. This particular feature will be seen as especially advantageous when it is realized that pools must often be tailored to particular and arbitrary sizes.

Although the PCR test is highly sensitive and is capable of detecting a single virus in a contaminated sample, a virus must necessarily be present in the sample for the PCR test to provide a positive result. If, for example, a sample from a contaminated donation having a relatively low virus concentration is pooled together with a large number of uncontaminated samples, the concentration of virus in the resulting pool may be so low that there is a statistical probability that no virus will be present in a sample taken from the pool for PCR testing. Such pools may, indeed, falsely test negative for viral contamination.

For example, if a 0.02 ml sample was prepared from a plasma donation contaminated with viruses at a concentration of 500 viruses per ml of sample, the 0.02 ml sample would comprise, on average, 10 viruses. If this 0.02 ml contaminated sample was pooled with approximately 500 other 0.02 ml samples from uncontaminated donations, the resulting 10 ml pool would comprise viruses at a concentration at about 1 virus per ml. Accordingly, if a 1 ml sample were taken from the pool for PCR testing, there is a significant statistical probability that the PCR sample will contain no viruses.

Such low concentrations of virus contamination pose little threat for products produced from plasma, because several methods are available for inactivating viruses present in such low concentration donations. Such viral inactivation methods include the use of solvent/detergent or heating the donation at over 60° C. for an appropriate time, and the like. These methods, generally, are described as being capable of reducing the concentration of viruses by a number of "log units". For example, the solvent detergent method is capable of reducing the viral concentration of hepatitis C by at least $10^7$ per ml or "7 log units". Thus, plasma products such as Factor VIII, Factor IX or Prothrombin complex may be prepared from plasma donations routinely treated by, for example, the solvent detergent method after having been PCR tested negative.

For blood products routinely transfused directly to a recipient, there remains some small risk of low concentration viral contamination, after such donations have tested PCR negative.

The factors discussed above, such as the frequency of occurrence of the virus at interest in the donor population and the likely concentration of any such virus after dilution, are evaluated in order to determine the appropriate size of a pool from which PCR test samples will be taken. An appropriately sized first level PCR testing pool must be designed in a manner which minimizes the statistical probability that viruses present in low concentrations will go undetected.

It is therefore clear from the foregoing, that the system and method of the present invention, including the provision of tubing segments comprising individual and connected sample aliquot containers each containing a sample of a blood or plasma donation, is advantageous in forming a multiplicity of PCR test pools. Unlike conventional pool preparation, in which a sequence of initial and subsequent pools are formed from a single sample of each donation at one time, the present invention allows for formation of test pools immediately prior to testing. This manner of "just-in-time" pool formation permits construction of test pools from individual sample containers only as needed.

Advantageously, PCR test pools may be formed by use of any one of a number of cost-effective, time-efficient sample harvesting apparatuses which may "gang" extract a multiplicity of samples or sequentially extract a multiplicity of samples either manually or under computer program control. Blood or plasma samples are efficiently extracted from a sample container by either a single autosampler needle or an array of autosampler needles, wherein each needle is configured to both aspirate the sample from the container and to provide a gas source for either venting purposes or to pressurize the interior of the container.

Those skilled in the art will appreciate that the foregoing examples and descriptions of various preferred embodiments of the present invention are merely illustrative of the invention as a whole, and that variations in the shape, size, and number of the various components of the present invention may be made within the spirit and scope of the invention. It will be clear to those skilled in the art that the system of the invention is not limited to the exemplary plasma collection container and an associated tubing segment comprising either sequential pouches or series-connected Y-sites. Blood bags or other biological fluid containers may be used with equal facility and suitable tubing segments may be attached thereto prior to fluid collection and after fluid collection is completed. All that is required is that sample quantities of biological fluids be transferred to a tubing segment which is then formed into sample aliquot containers from which the biological fluid samples are extracted in order to form pools in accordance with practice of the invention.

Accordingly, the present invention is not limited to the specific embodiments described herein, but, rather, is defined by the scope of the appended claims.

What is claimed is:

1. A system for preparing a plasma pool from a multiplicity of separate plasma donations, the system comprising:

a plurality of separate plasma donations;

means for drawing a plasma sample from each donation into a corresponding collection segment;

means for providing a plurality of spaced-apart seals at intervals along the length of each collection segment, the segment portions in the intervals between the seals defining sample aliquot containers, each container containing a plasma sample;

a sample container tray including a plurality of container receptacles, each receptacle spaced-apart and disposed in a pre-determined regular array, each receptacle configured to receive respective ones of the sample aliquot containers;

a pooling manifold;

a regular linear array of dual-channel vented autosampler needles, connected to the pooling manifold, each autosampler needle spaced-apart a pre-determined distance from another autosampler needle so as to form a regular array, the array spacing having the same dimension as the receptacle array spacing; and means connected to the pooling manifold for withdrawing a portion of the contents of each said container so as to form a pool.

2. The system according to claim 1, wherein the segment portions in the intervals between the seals comprise rigid thermo-plastic tubing in the shape of a Y, including an injection site provided on one leg of the Y, thus defining a Y-site, wherein each such Y-site contains a blood or plasma sample, and wherein each Y-site is dimensioned to provide at least a sufficient volume in the Y-site for combination with at least one additional volume so as to prepare a pool.

3. The system according to claim 2, wherein the Y-sites are linked together in a chain and wherein each branch leg of a particular Y-site which does not include an injection site is connected to a branch leg of a next Y-site in the chain by a flexible hollow tubing segment.

4. A system according to claim 3, wherein the plurality of spaced-apart seals are heat seals, the heat seals being formed along the length of each flexible hollow tubing segment disposed between Y-sites.

5. The system according to claim 1, wherein the collection segment comprises a flexible hollow tubing segment, the segment portions in the intervals between the spaced-apart seals defining pouches, wherein each such pouch contains a blood or plasma sample, and wherein the intervals between pouches are selected to provide at least a sufficient volume in each pouch for combination with additional such volumes so as to form a pool.

6. The system according to claim 1, wherein said portion of the contents withdrawn from each said sample aliquot container is from about 0.02 to about 0.5 milliliters.

7. A system according to claim 1, wherein said sample container tray comprises 64 receptacles disposed in a regular, spaced-apart 8×8 array.

8. A system according to claim 7, wherein said regular linear array of vented autosampler needles comprises 8 autosampler needles disposed in a regular spaced apart fashion, where a spacing between the array of autosampler needles corresponds to a spacing between receptacles.

9. The system according to claim 1, wherein the pooling manifold comprises a hollow, generally cylindrical tube, and wherein the means for withdrawing a portion of the container contents comprises a vacuum source connected to the pooling manifold, such that upon application of a vacuum, a portion of the contents of each sample aliquot containers is drawn into the manifold hollow.

10. An automated system for preparing a plasma pool from a multiplicity of separate plasma donations, the system comprising:

a plurality of separate plasma donations;

means for drawing a plasma sample from each donation into a corresponding tubing segment;

means for providing a plurality of spaced-apart seals at intervals along the length of each tubing segment, the segment portions in the intervals between the seals defining sample aliquot containers, each container containing a plasma sample;

a rotatable sample-containing carousel, disposed within a closed container, the carousel including a regular array of receptacles, each receptacle configured to receive a respective one of the sample aliquot containers;

a cover disposed over the carousel, the cover including at least one gasketed opening such that the cover and closed container define a sealed environment enclosing said carousel;

a dual-channel autosampler needle including first and second coaxially disposed cylindrical portions, the cylindrical portions dimensioned to sealingly extend through the gasketed opening;

a movable arm disposed in cantilever fashion over the carousel cover, the dual-channel autosampler needle coupled to a distal end of the arm, the arm being movable so as to position the autosampler needle over an at least one gasketed opening, the arm being further movable to extend the autosampler needle through an at least one gasketed opening so as to place the autosampler needle into contact with a selected one of the sample aliquot containers, whereby the autosampler needle withdraws a portion of the contents of the sample aliquot container and is removed from communication with the container by raising the arm, and whereby the carousel is rotatably moved to thereby index a next sample aliquot container beneath said at least one gasketed opening and the dual-channel autosampler needle is extended into communication with said next container and a portion of its contents are withdrawn; and forming a pool with the withdrawn portions of each sample aliquot container.

11. The automated system according to claim 10, wherein the segment portions in the intervals between the seals comprise rigid thermo-plastic tubing in the shape of a Y, including an injection site provided on one leg of the Y, thus defining a Y-site, wherein each such Y-site contains a blood or plasma sample, and wherein each Y-site is dimensioned to provide at least a sufficient volume in the Y-site for combination with at least one additional volume so as to prepare a pool.

12. The automated system according to claim 11, wherein the Y-sites are linked together in a chain and wherein each branch leg of a particular Y-site which does not include an injection site is connected to a branch leg of a next Y-site in the chain by a flexible hollow tubing segment.

13. An automated system according to claim 12, wherein the plurality of spaced-apart seals are heat seals, the heat seals being formed along the length of each flexible hollow tubing segment disposed between Y-sites.

14. The automated system according to claim 10, wherein the collection segment comprises a flexible hollow tubing segment, the segment portions in the intervals between the spaced-apart seals defining pouches, wherein each such pouch contains a blood or plasma sample, and wherein the intervals between pouches are selected to provide at least a sufficient volume in each pouch for combination with additional such volumes so as to form a pool.

15. An automated system according to claim 14, wherein said portion of the contents withdrawn from each said sample aliquot container is from about 0.02 to about 0.5 milliliters.

16. An automated system according to claim 10, wherein the rotatable sample-containing carousel further comprises a plurality of concentric, generally circular sample aliquot container receptacle arrays, each respective one of the plurality of concentric arrays having an equal number of receptacles as another respective one of the concentric arrays, the receptacles disposed within each respective concentric array so as to lie along a radius thereof.

17. The automated system according to claim 16, wherein the movable aim is disposed in cantilever fashion over the carousel and oriented in a direction parallel to and disposed to extend over a carousel radius as defined by said container receptacles.

18. The automated system according to claim 17, further comprising a plurality of gasketed openings disposed in the carousel cover, the gasketed openings configured in a regular spaced-apart array such that each gasketed opening is positioned above a corresponding one of the sample aliquot container receptacles defining a radius of the concentric receptacle arrays, the gasketed opening array providing access to each receptacle along said radius as each radius is rotatably indexed by the carousel.

19. An automated system according to claim 18, further comprising:

a pooling manifold coupled to a distal end of the movable arm; and a regular linear array of dual-channel vented autosampler needles, connected to the pooling manifold, each autosampler needle spaced-apart a pre-determined distance from another autosampler needle so as to form a regular array, the array spacing having the same dimension as the gasketed opening array spacing, the movable arm positioning the pooling manifold over the gasketed opening array so as to extend the autosampler needle array through said gasketed opening array and place the autosampler needle array into contact with a plurality of sample aliquot containers defining a radius of the plurality of concentric container receptacle arrays, whereby the autosampler needle array withdraws a portion of the contents of the plurality of sample aliquot containers, thereby forming a pool.

20. The automated system according to claim 19, wherein the movable arm is operatively responsive to motion commands provided by a control processor.

21. The automated system according to claim 20, wherein the sample-containing carousel is rotatably indexed to provide sequential radii of sample aliquot container receptacles for access beneath said gasketed opening array in accordance with index commands provided by a control processor.

22. An autosampler apparatus adapted for insertion into a blood or plasma sample aliquot container to withdraw an aliquot portion of the contents therefrom in order to prepare a plasma pool, the autosampler apparatus comprising:

a generally tubular piercing member having a hollow interior bore defining a first communication path, the bore having an orifice formed at a distal end of the piercing member for facilitating communication to the bore;

a shroud disposed coaxially with the piercing member and extending at least partially along the length of the piercing member, the shroud surrounding the piercing member and spaced-apart from an exterior peripheral surface of the piercing member so as to define an annular chamber;

a vent chamber coupled to the shroud and in communication with the annular chamber defined by the shroud, the piercing member extending through the vent chamber in non-communication fashion; and a vent fitting coupled to the vent chamber to provide a fluid communication path to the vent chamber and the shroud's annular chamber, the vent fitting, vent chamber and the shroud's annular chamber in combination providing means for equalizing pressure when the autosampler apparatus is inserted into a sample aliquot container and a blood or plasma sample is extracted therefrom through the bore of the piercing member.

23. The autosampler apparatus according to claim 22, wherein the piercing member is connected to a vacuum source and a blood or plasma sample is withdrawn from a sample aliquot container by said vacuum, the vent fitting being opened to ambient atmosphere to thereby equalize pressure.

24. The autosampler apparatus according to claim 22, whereby the vent fitting is connected to a pressurized gas source, the pressurized gas introduced into a sample aliquot container through said vent chamber and the shroud's annular chamber to thereby pressurize the container and force a blood or plasma sample into the bore of the piercing member from whence it is extracted to form a pool.

25. The autosampler apparatus according to claim 22, wherein said piercing member terminates at a distal end in a sharps.

26. The autosampler apparatus according to claim 22, wherein the piercing member terminates at a distal end in a deflected, non-coring tip.

27. The autosampler apparatus according to claim 22, wherein the piercing member is adapted to penetrate a septum formed in a branch leg of a sample aliquot container defining a Y-site.

28. A process for preparing a plasma pool from a multiplicity of separate plasma donations, the process comprising:

providing a plurality of separate plasma donations;

drawing a plasma sample from each donation into a corresponding collection segment;

providing a plurality of spaced-apart seals at intervals along the length of each collection segment, the segment portions in the intervals between the seals defining sample aliquot containers, each container for holding a plasma sample;

providing a vented autosampler needle, the autosampler needle including a first cylindrical portion for defining a fluid path through the needle, the autosampler needle further including a second cylindrical portion disposed coaxially with the first cylindrical portion, the second cylindrical portion for providing pressure relief;

providing a sample aliquot container holder, the holder having a plurality of receptacles each configured to receive respective ones of the sample aliquot containers;

inserting the autosampler needle into each sample aliquot containers, thereby placing the first cylindrical portion of the needle into fluid communication with a blood or plasma sample contained therein, the holder positioning each sample aliquot container for access by the autosampler needle;

withdrawing a portion of the contents of each said container through the first cylindrical portion, the first and second cylindrical portions of the autosampler needle operating to equalize pressure within said container; and combining the content portions of each sample aliquot container into a pool.

* * * * *